United States Patent
Ye et al.

(10) Patent No.: US 10,533,063 B2
(45) Date of Patent: Jan. 14, 2020

(54) SUPPORTED CATALYST SYSTEMS AND PROCESSES FOR USE THEREOF

(71) Applicant: ExxonMobil Chemical Patents Inc., Baytown, TX (US)

(72) Inventors: Xuan Ye, Houston, TX (US); John R. Hagadorn, Houston, TX (US); Matthew W. Holtcamp, Huffman, TX (US); Gregory S. Day, College Station, TX (US); David F. Sanders, Beaumont, TX (US); Carlos R. Lopez-Barron, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/565,603

(22) PCT Filed: Mar. 10, 2016

(86) PCT No.: PCT/US2016/021757
§ 371 (c)(1),
(2) Date: Oct. 10, 2017

(87) PCT Pub. No.: WO2016/171810
PCT Pub. Date: Oct. 27, 2016

(65) Prior Publication Data
US 2018/0118860 A1    May 3, 2018

Related U.S. Application Data

(60) Provisional application No. 62/149,807, filed on Apr. 20, 2015.

(30) Foreign Application Priority Data

Jun. 12, 2015  (EP) .................................... 15171803

(51) Int. Cl.
*C08F 210/16* (2006.01)
*C08F 4/659* (2006.01)
*C08F 4/6592* (2006.01)

(52) U.S. Cl.
CPC ............ *C08F 210/16* (2013.01); *C08F 4/659* (2013.01); *C08F 4/65912* (2013.01);
(Continued)

(58) Field of Classification Search
CPC .. C08F 210/16; C08F 210/14; C08F 4/64148; C08F 4/65904; C08F 4/025; C08F 4/659;
(Continued)

(56) References Cited

U.S. PATENT DOCUMENTS 5,032,562 A   7/1991  Lo et al.
5,183,867 A   2/1993  Welborn, Jr.
(Continued)

FOREIGN PATENT DOCUMENTS

EP   0676418 A   10/1995
EP   2003166 A   12/2008
(Continued)

OTHER PUBLICATIONS

Chen, K. et al., "Modeling and Simulation of Borstar Bimodal Polyethylene Process Based on a Rigorous PC-SAFT Equation of State Model", Industrial & Engineering Chemistry Research, vol. 53, Issue 51, pp. 19905-19915, 2004.
(Continued)

*Primary Examiner* — William K Cheung
(74) *Attorney, Agent, or Firm* — Frank E. Reid

(57) ABSTRACT

This invention relates to a supported catalyst system and process for use thereof. In particular, the catalyst system includes a pyridyldiamido transition metal complex, a met-
(Continued)

allocene compound, a support material and, optionally, an activator. The catalyst system may be used for preparing multi-modal polyolefins.

22 Claims, 9 Drawing Sheets

(52) U.S. Cl.
CPC ...... *C08F 4/65916* (2013.01); *C08F 4/65925* (2013.01); *C08F 2500/04* (2013.01); *C08F 2500/05* (2013.01); *C08F 2500/12* (2013.01)

(58) Field of Classification Search
CPC .............. C08F 4/65912; C08F 4/65916; C08F 4/65925; C08F 2500/01; C08F 2500/03; C08F 2500/12; C08F 2500/18; C08F 2500/04; C08F 2500/05; C08F 2500/11; C08F 2500/13
USPC ........................................................ 526/129
See application file for complete search history.

(56) References Cited

U.S. PATENT DOCUMENTS

| | | | |
|---|---|---|---|
| 5,525,678 A | 6/1996 | Mink et al. | |
| 6,103,657 A | 8/2000 | Murray | |
| 6,828,394 B2 | 12/2004 | Vaughan et al. | |
| 6,900,321 B2 | 5/2005 | Boussie et al. | |
| 6,956,094 B2 | 10/2005 | Mawson et al. | |
| 6,964,937 B2 | 11/2005 | Mink et al. | |
| 6,995,109 B2 | 2/2006 | Mink et al. | |
| 7,129,302 B2 | 10/2006 | Mink et al. | |
| 7,141,632 B2 | 11/2006 | Vaughan et al. | |
| 7,172,987 B2 | 2/2007 | Kao et al. | |
| 7,199,072 B2 | 4/2007 | Crowther et al. | |
| 7,260,552 B2 * | 8/2007 | Riera Jorba ....... G06Q 20/3674 380/277 | |
| 7,595,364 B2 | 9/2009 | Shannon et al. | |
| 7,619,047 B2 | 11/2009 | Yang et al. | |
| 7,855,253 B2 | 12/2010 | Shannon et al. | |
| 7,973,116 B2 * | 7/2011 | Hagadorn ............ C07D 213/38 526/172 | |
| 8,138,113 B2 | 3/2012 | Yang et al. | |
| 8,378,029 B2 | 2/2013 | Liu et al. | |
| 9,290,519 B2 * | 3/2016 | Hagadorn ................. C07F 7/00 | |
| 9,315,526 B2 * | 4/2016 | Hagadorn ................. C07F 7/00 | |
| 9,315,593 B2 * | 4/2016 | Hagadorn ............ C08F 4/65912 | |
| 2002/0142912 A1 | 10/2002 | Boussie et al. | |
| 2006/0275571 A1 | 12/2006 | Mure et al. | |
| 2011/0118417 A1 | 5/2011 | Liu et al. | |
| 2014/0127427 A1 | 5/2014 | Vantomme et al. | |
| 2014/0163181 A1 | 6/2014 | Yang et al. | |
| 2014/0256893 A1 | 9/2014 | Hagadorn et al. | |
| 2014/0316089 A1 | 10/2014 | Hagadorn et al. | |
| 2015/0141590 A1 | 5/2015 | Hagadorn et al. | |
| 2016/0032027 A1 | 2/2016 | St. Jean et al. | |
| 2018/0079845 A1 | 3/2018 | Doufas et al. | |

FOREIGN PATENT DOCUMENTS

| | | |
|---|---|---|
| WO | 95/13871 A | 5/1995 |
| WO | 97/35891 A | 10/1997 |
| WO | 98/49209 A | 11/1998 |
| WO | 2007/067259 A | 6/2007 |
| WO | 2012/158260 A | 11/2012 |
| WO | 2013/028283 A | 2/2013 |
| WO | 2014/123683 | 8/2014 |
| WO | 2015/138674 A | 9/2015 |
| WO | 2016/018696 A | 2/2016 |

OTHER PUBLICATIONS

Sheu, S., "Enhanced Bimodal PE make the impossible", Presentation, Borouge Pte Ltd., Shanghai, 2006.

* cited by examiner

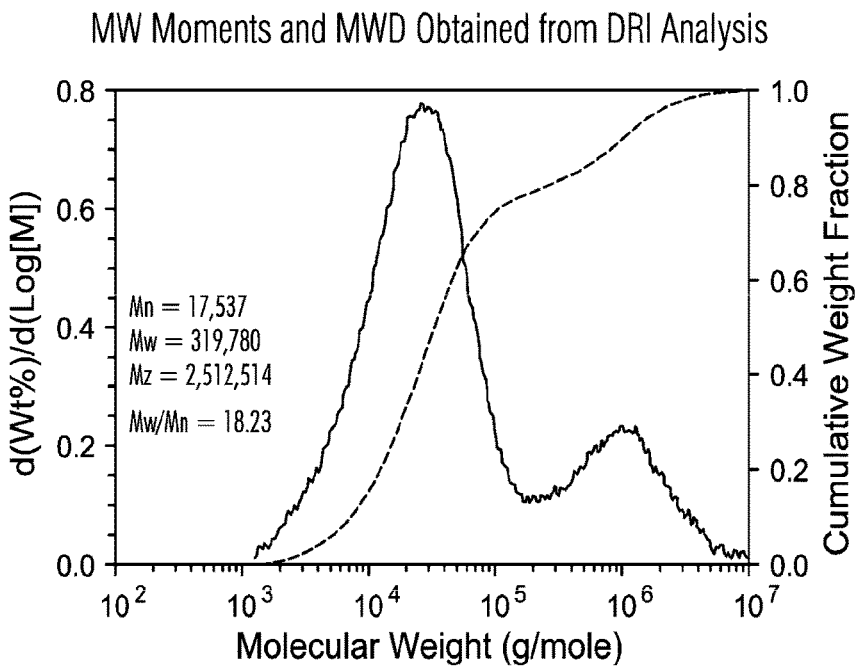

MW Moments and MWD Obtained from DRI Analysis $M_n = 17{,}537$
$M_w = 319{,}780$
$M_z = 2{,}512{,}514$
$M_w/M_n = 18.23$

Run Conditions and Instrument & Polymer Parameters

Analyzed as ethylene-hexene copolymer with 13.6 weight percent comonomer

Inject Mass (mg) = 0.1221
Calc. Mass (mg) = 0.131 (107.1%)
Adjusted Flow Rate (ml/m) = 0.559
Column Cal. C0 = 11.792
Column Cal. C1 = -0.28069
Column Cal. C2 = -0.0018162
Column Cal. C3 = 0
Inject Mark (ml) = 33.188
Vistalon BI = 0.914

Linear Zimm Analysis
A2 (Input Value) = 0.0015
(dn/dc) = 0.1048
LS to DRI (ml) = 0.187
LS to Vis. (ml) = 0.388
K (sample) = 0.00051994
alpha (sample) = 0.695
LS Calib. Const. = 0.00024214
DRI Const. = 0.0002275
DP Const. = 0.6343
IP Gain = 22.97 mV/KPa

FIG. 2a, continued

SUPPORTED CATALYST SYSTEMS AND PROCESSES FOR USE THEREOF

CROSS-REFERENCE OF RELATED APPLICATIONS

This application is a National Phase Application of International Application Serial No. PCT/US2016/021757, filed Mar. 10, 2016, that claims the benefit of and priority to Provisional Application No. 62/149,807, filed Apr. 20, 2015 and EP Application No.: 15171803.8, filed Jun. 12, 2015, the disclosures of which are hereby incorporated by reference in their entireties.

FIELD OF INVENTION

This invention relates to a supported catalyst system and process for use thereof. In particular, the catalyst system comprises a pyridyldiamido transition metal compound, a metallocene compound, a support material and, optionally, an activator. The catalyst system may be used for olefin polymerization processes.

BACKGROUND OF INVENTION

Polyolefins, such as polyethylenes, which have high molecular weight, generally have improved mechanical properties over their lower molecular weight counterparts. However, high molecular weight polyolefins can be difficult to process and can be costly to produce. Polyolefins having a bimodal molecular weight distribution are desirable because they can combine the advantageous mechanical properties of high molecular weight ("HMW") fraction with the improved processing properties of the low molecular weight ("LMW") fraction.

There are several methods for producing bimodal or broad molecular weight distribution polyolefins, e.g., melt blending, reactor in series or parallel configuration, or single reactor with bimetallic catalysts. However, melt blending suffers from the disadvantages brought on by the needs of complete homogenization and high cost.

Bimetallic catalysts such as those disclosed in U.S. Pat. Nos. 5,032,562; 5,525,678; and EP 0,729,387, can produce bimodal polyolefins in a single reactor. These catalysts typically include a non-metallocene catalyst component and a metallocene catalyst component which produce polyolefins having different average molecular weights. U.S. Pat. No. 5,525,678, for example, discloses a bimetallic catalyst including a titanium non-metallocene component which produces a HMW fraction, and a zirconium metallocene component which produces a LMW fraction.

As stated in U.S. Pat. No. 6,995,109, controlling the relative amounts of each catalyst in a reactor, or the relative reactivity of the different catalysts, allows control of the bimodal product. Other background references include EP 0,676,418; WO 98/49209; WO 97/35891; and U.S. Pat. No. 5,183,867.

Bimetallic catalysts are also disclosed in, for example, U.S. Pat. Nos. 7,199,072; 7,141,632; 7,172,987; 7,129,302; 6,964,937; 6,956,094; and 6,828,394.

Those non-metallocene catalysts, such as pyridyl amines, have been used to prepare Group 4 complexes which are useful transition metal components for use in the polymerization of olefins, see, for example, US 2002/0142912; U.S. Pat. Nos. 6,900,321; and 6,103,657, where this kind of ligands has been used in complexes in which the ligands are coordinated in a bidentate fashion to the transition metal atom. Another example, U.S. Pat. No. 7,973,116, provides pyridyldiamido transition metal complexes and processes to polymerize olefins using such pyridyldiamido complexes. Other background references include US 2015/141590, US 2014/256893, US 2014/316089, WO 2014/123683, and WO 2013/028283.

It is still desirous to develop bimetallic catalyst systems for the production of bimodal polyolefins in a single reactor to increase commercial usefulness and produce polymers having improved properties.

SUMMARY OF INVENTION

This invention relates to a supported catalyst system comprising: (i) at least one first catalyst component comprising a pyridyldiamido transition metal complex; (ii) at least one second catalyst component comprising a metallocene compound; (iii) a support material; and (iv) optionally, an activator;
wherein the pyridyldiamido transition metal complex has the general formula (I):

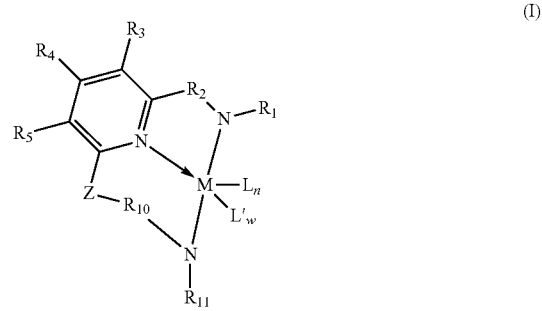

wherein:
M is Ti, Zr, or Hf;
Z is —$(R_{14})_pC$—$C(R_{15})_q$—, where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1 or 2, and q is 0, 1 or 2;
$R_1$ and $R_{11}$ are independently selected from the group consisting of hydrocarbyls, substituted hydrocarbyls, and silyl groups;
$R_2$ and $R_{10}$ are each, independently, -$E(R_{12})(R_{13})$— with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;
$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

This invention also relates to a process for polymerization of olefin monomers comprising contacting one or more monomers with the above supported catalyst systems.

This invention also relates to a multi-modal polyolefin catalyzed by the above supported catalyst systems.

DETAILED DESCRIPTION OF THE PRESENT INVENTION

Figure 1:
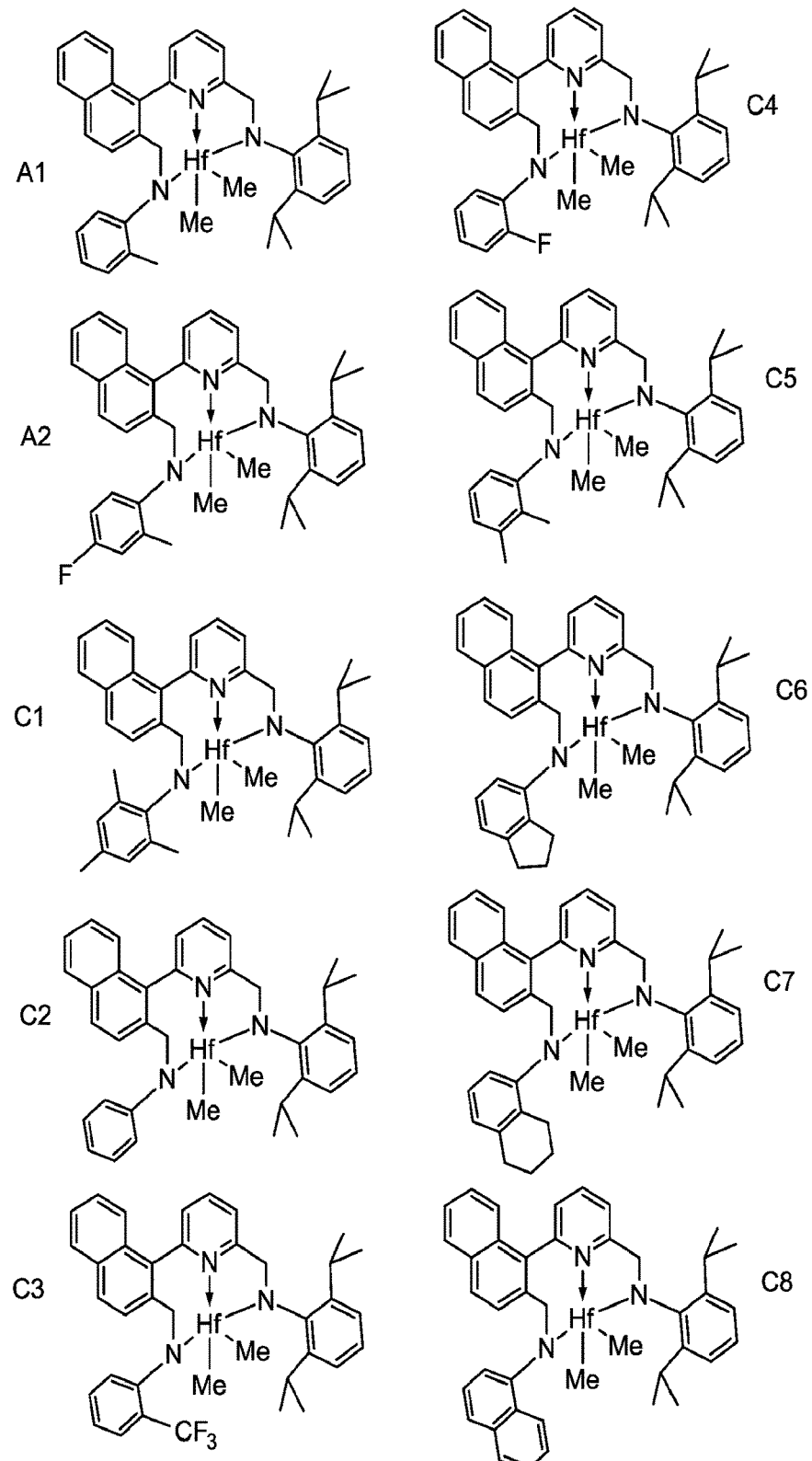
FIG. 1 provides some of the formulae for the pyridyl-diamido transition metal complexes.

Selected embodiments will now be described in more detail, but this description is not meant to foreclose other embodiments within the broader scope of this invention.

For purposes of this invention and the claims thereto, a "catalyst system" is a combination of at least two metal catalyst compounds, an activator, and a support material. The catalyst systems may further comprise one or more additional catalyst compounds. The terms "mixed catalyst system", "bimetallic catalyst system", "mixed catalyst", and "supported catalyst system" may be used interchangeably herein with "catalyst system".

In a class of embodiments, the catalyst systems of this invention comprise a first catalyst component that produces generally high molecular weight polyolefin, and a second catalyst component that produces generally low molecular weight polyolefin. The first catalyst component that produces high molecular weight polyolefin may be referred to herein as a "high molecular weight catalyst". The second catalyst component that produces generally low molecular weight polyolefin may be referred to herein as a "low molecular weight catalyst". It should be understood that the molecular weight is in reference to the polymer produced by the catalyst and not the molecular weight of the catalyst itself.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

Complex, as used herein, is also often referred to as "catalyst precursor", "pre-catalyst", "catalyst", "catalyst compound", "metal compound", "transition metal compound", or "transition metal complex". These words are used interchangeably. "Activator" and "cocatalyst" are also used interchangeably.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this invention, "hydrocarbyl radical" is defined to be $C_1$-$C_{100}$ radicals, that may be linear, branched, or cyclic, and when cyclic, aromatic or non-aromatic.

Substituted hydrocarbyl radicals are radicals in which at least one hydrogen atom of the hydrocarbyl radical has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like, or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise heteroaryl means an aryl group where a ring carbon atom (or two or three ring carbon atoms) has been replaced with a heteroatom, preferably, N, O, or S.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27, (1985).

An "olefin", is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, t-Bu and $^tBu$ are tertiary butyl, iPr and $^iPr$ are isopropyl, Cy is cyclohexyl, THF (also referred to as thf) is tetrahydrofuran, Bn is benzyl, and Ph is phenyl.

This invention relates to a supported catalyst system comprising: (i) at least one first catalyst component comprising a pyridyldiamido transition metal complex; (ii) at least one second catalyst component comprising a metallocene compound; (iii) a support material; and (iv) optionally, an activator; wherein the pyridyldiamido transition metal complex has the general formula (I):

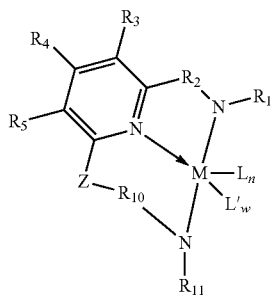

(I)

wherein,

M is Ti, Zr, or Hf,

Z is —$(R_{14})_pC$—$C(R_{15})_q$—, where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1 or 2, and q is 0, 1 or 2;

$R_1$ and $R_{11}$ are independently selected from the group consisting of hydrocarbyls, substituted hydrocarbyls, and silyl groups;

$R_2$ and $R_{10}$ are each, independently, -$E(R_{12})(R_{13})$— with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;

$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

In a preferred embodiment, the metallocene compound is represented by the formula $Cp^ACp^BM'X'_n$, wherein $Cp^A$ and $Cp^B$ may each be independently selected from the group consisting of cyclopentadienyl ligands and ligands isolobal to cyclopentadienyl, either or both $Cp^A$ and $Cp^B$ may contain heteroatoms, and either or both $Cp^A$ and $Cp^B$ may be substituted; wherein M' is Ti, Zr, or Hf; wherein X' may be any leaving group; wherein n is 0, 1, 2, 3, or 4.

This invention also relates to a process for polymerization of olefin monomers comprises contacting one or more monomers with the above supported catalyst systems.

It is also found that the above two catalyst components show different hydrogen responses (each having a different reactivity toward hydrogen) during the polymerization process. Hydrogen is often used in olefin polymerization to control the final properties of the polyolefin. The first catalyst component shows a more negative response to changes of hydrogen concentration in reactor than the second catalyst component. Owing to the differing hydrogen response of the catalyst components in the supported catalyst systems, the properties of resulting polymer are more controllable. Changes of hydrogen concentration in reactor may affect molecular weight, molecular weight distributions, and other properties of the resulting polyolefin when using a combination of such two catalyst components. Thus, this invention further provides a multi-modal polyolefin catalyzed by the above supported catalyst systems.

Pyridyldiamido Transition Metal Complex

In one aspect of the invention, the supported catalyst systems comprise a pyridyldiamido transition metal complex having the general formula (I):

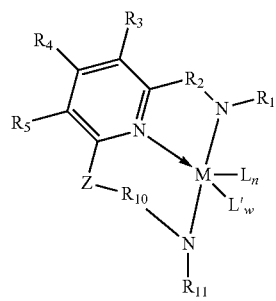

(I)

M is a Group 3, 4, 5, 6, 7, 8, 9, 10, 11, or 12 metal, preferably, a group 4 metal, more preferably, Ti, Zr, or Hf;

Z is $-(R_{14})_p C-C(R_{15})_q-$, where $R_{14}$ and $R_{15}$ are independently selected from the group consisting of hydrogen, hydrocarbyls, and substituted hydrocarbyls, (preferably, hydrogen and alkyls), and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 1 or 2, and q is 1 or 2;

$R_1$ and $R_{11}$ are independently selected from the group consisting of hydrocarbyls, substituted hydrocarbyls, and silyl groups (preferably, alkyl, aryl, heteroaryl, and silyl groups);

$R_2$ and $R_{10}$ are each, independently, $-E(R_{12})(R_{13})-$ with E being carbon, silicon, or germanium, and each $R_{12}$ and $R_{13}$ being independently selected from the group consisting of hydrogen, hydrocarbyl, and substituted hydrocarbyl, alkoxy, silyl, amino, aryloxy, halogen, and phosphino (preferably, hydrogen, alkyl, aryl, alkoxy, silyl, amino, aryloxy, heteroaryl, halogen, and phosphino), $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;

$R_3$, $R_4$, and $R_5$ are independently selected from the group consisting of hydrogen, hydrocarbyls, substituted hydrocarbyls, alkoxy, aryloxy, halogen, amino, and silyl, (preferably, hydrogen, alkyl, alkoxy, aryloxy, halogen, amino, silyl, and aryl), and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

Preferably, the R groups above and other R groups mentioned hereafter, contain up to 30, preferably, no more than 30 carbon atoms, especially from 2 to 20 carbon atoms.

Preferably, the group represented by E is carbon, and $R_1$ and $R_{11}$ are independently selected from phenyl groups that are variously substituted with between zero to five substituents that include F, Cl, Br, I, $CF_3$, $NO_2$, alkoxy, dialkylamino, hydrocarbyl, and substituted hydrocarbyls, groups with from one to ten carbons.

Preferably, the group represented by L is selected from halide, alkyl, aryl, alkoxy, amido, hydrido, phenoxy, hydroxy, silyl, allyl, alkenyl, and alkynyl; and the group represented by L' is selected from ethers, thio-ethers, amines, nitriles, imines, pyridines, and phosphines.

In one preferred embodiment, Z is defined as an aryl so that the complex corresponds to formula (II):

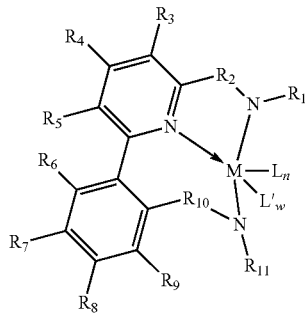

(II)

wherein:

$R_6$, $R_7$, $R_8$, and $R_9$ are independently selected from the group consisting of hydrogen, hydrocarbyls, substituted hydrocarbyls, alkoxy, halogen, amino, and silyl, and the pairs of positions, and wherein adjacent R groups ($R_6$&$R_7$, and/or $R_7$&$R_8$, and/or $R_8$&$R_9$, and/or $R_9$&$R_{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are as defined above.

In a preferred embodiment, $R_1$ and $R_{11}$ may be independently selected from phenyl groups that are variously substituted with between zero to five substituents that include F, Cl, Br, I, $CF_3$, $NO_2$, alkoxy, dialkylamino, aryl, and alkyl groups with between one to ten carbons.

In a more preferred embodiment, the complexes of this invention are of the formula (III):

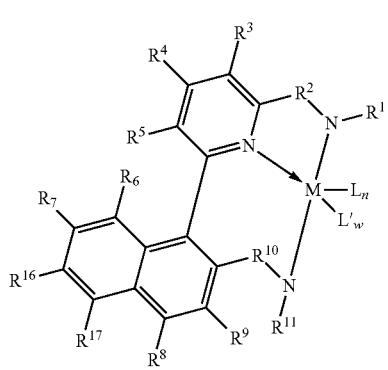

(III)

wherein:

$R^6$, $R^7$, $R^8$, $R^9$, $R^{16}$ and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^{10}$ and $R^{11}$ are defined as above.

These complexes may be used in combination with appropriate activators for olefin polymerization such as ethylene-based polymers or propylene-based polymers, including ethylene-hexene polymerization.

In further embodiments, it is preferred that $R_1$ to $R_{13}$ contain up to 30 and no more than 30 carbon atoms, especially from 2 to 20 carbon atoms. $R_1$ and $R_{11}$ substituted on the nitrogen atom are preferably, selected from aryl group containing from 6 to 30 carbon atoms, especially phenyl groups. It is preferred that $R_1$ and $R_{11}$ be chosen from aryl or alkyl groups and that $R_{12}$ through $R_{15}$ be independently chosen from hydrogen, alkyl, and aryl groups, such as phenyl. The phenyl groups may be alkyl substituted. The alkyl substituents may be straight chain alkyls but include branched alkyls.

Preferably, each $R_1$ and $R_{11}$ are a substituted phenyl group with either one or both of the carbons adjacent to the carbon joined to the amido nitrogen being substituted with a group containing between one to ten carbons. Some specific examples would include $R_1$ and $R_{11}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

$R_2$ is preferably, selected from moieties where E is carbon, especially a moiety —C($R_{12}$)($R_{13}$)— where $R_{12}$ is hydrogen and $R_{13}$ is an aryl group or a benzyl group (preferably, a phenyl ring linked through an alkylene moiety such as methylene to the C atom). The phenyl group may then be substituted as discussed above. Preferably, $R_3$ to $R_9$ are hydrogen or alkyl from 1 to 4 carbon atoms. Preferably, 0, 1 or 2 of $R_3$ to $R_9$ are alkyl substituents.

The pyridyldiamido metal complex (I) is coordinated to the metal center as a tridentate ligand through two amido donors and one pyridyl donor. The metal center M is a transition metal from Groups 3 to 12. While in its use as a catalyst, according to current theory M is preferably, in its four valent state, it is possible to create compounds in which M has a reduced valency state and regains its formal valency state upon preparation of the catalysts system by contacting with an activator. Preferably, in addition to the pyridyldiamido ligand, the metal M is also coordinated to n number of anionic ligands, with n being from 1 to 4. The anionic donors are typically halide or alkyl, but a wide range of other anionic groups are possible including some that are covalently linked together to form molecules that could be considered dianionic, such as oxalate. For certain complexes it is likely that up to three neutral Lewis bases (L'), typically ethers, could also be coordinated to the metal center. In a preferred embodiment w is 0, 1, 2 or 3.

A preferred synthesis of the pyridyldiamido complexes is reaction of the neutral pyridyldiamine ligand precursors with a metalloamide, including Zr(NMe$_2$)$_4$, Zr(NEt$_2$)$_4$, Hf(NMe$_2$)$_4$, and Hf(NEt$_2$)$_4$. Another preferred synthesis of the pyridyldiamido complexes is the reaction of the neutral pyridyldiamine ligand precursors with an organolithium reagent to form the dilithio pyridyldiamido derivative followed by reaction of this species with either a transition metal salt, including ZrCl$_4$, HfCl$_4$, ZrCl$_4$(1,2-dimethoxyethane), HfCl$_4$(1,2-dimethoxyethane), ZrCl$_4$(tetrahydrofuran)$_2$, HfCl$_4$(tetrahydrofuran)$_2$, ZrBn$_2$Cl$_2$(OEt$_2$), HfBn$_2$Cl$_2$(OEt$_2$). Another preferred synthesis of the pyridyldiamido complexes is reaction of the neutral pyridyldiamine ligand precursors with an organometallic reactant, including ZrBn$_4$, ZrBn$_2$C$_{12}$(OEt$_2$), Zr(CH$_2$SiMe$_3$)$_4$, Zr(CH$_2$CMe$_3$)$_4$, HfBn$_4$, HfBn$_2$Cl$_2$(OEt$_2$), Hf(CH$_2$SiMe$_3$)$_4$, Hf(CH$_2$CMe$_3$)$_4$.

Metallocene Compound

As used herein, the "metallocene compound" in this invention may include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components".

In one aspect, the one or more metallocene catalyst components are represented by the formula (IV):

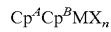

Cp$^A$Cp$^B$MX$_n$

The metal atom "M" of the metallocene catalyst compounds may be selected from the group consisting of Groups 3 through 12 atoms in one embodiment, and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0, 1, 2, 3, 4, and either 1 or 2 in a particular embodiment.

The ligands represented by Cp$^A$ and Cp$^B$ in formula (IV) may be the same or different cyclopentadienyl ligands or ligands isolobal to cyclopentadienyl, either or both of which may contain heteroatoms and either or both of which may be substituted by a group R. In one embodiment, Cp$^A$ and Cp$^B$ are independently selected from the group consisting of cyclopentadienyl, indenyl, tetrahydroindenyl, fluorenyl, and substituted derivatives of each.

Independently, each Cp$^A$ and Cp$^B$ of formula (IV) may be unsubstituted or substituted with any one or combination of substituent groups R. Non-limiting examples of substituent groups R as used in structure (IV) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular, non-limiting examples of alkyl substituents R associated with formula (IV) includes methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically unsaturated substituents including vinyl-terminated ligands, for example, 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R, such as 1-butanyl, may form a bonding association to the element M.

Each X in formula (IV) is independently selected from the group consisting of: any leaving group in one embodiment; halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In another embodiment, X is $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment.

Other non-limiting examples of X groups in formula (IV) include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In another aspect, the metallocene catalyst component includes those of formula (IV) where $Cp^A$ and $Cp^B$ are bridged to each other by at least one bridging group (A), such that the structure is represented by formula (V): $Cp^A(A)Cp^B MX_n$.

These bridged compounds represented by formula (V) are known as "bridged metallocenes". $Cp^A$, $Cp^B$, M, X and n are as defined above for formula (IV); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as, but not limited to, at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (IV) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, —$Si(R'_2)Si(R'_2)$—, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (V) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example, 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may, optionally, be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally, fused) ring structures may carry one or more substituents. Illustrative, non-limiting examples of these substituents are hydrocarbyl (particularly alkyl) groups and halogen atoms.

The ligands $Cp^A$ and $Cp^B$ of formula (IV) and (V) are different from each other in one embodiment, and the same in another embodiment.

In yet another aspect, the metallocene catalyst components include mono-ligand metallocene compounds (e.g., mono cyclopentadienyl catalyst components) such as described in WO 93/08221, for example. In this embodiment, the at least one metallocene catalyst component is a bridged "half-sandwich" metallocene represented by the formula (VI): $CP^A(A)QMX_n$, wherein $Cp^A$ is defined above and is bound to M; (A) is defined above and is a bridging group bonded to Q and $Cp^A$; and wherein an atom from the Q group is bonded to M; and n is 0 or an integer from 1 to 3; 1 or 2 in a particular embodiment. In formula (VI), $Cp^A$, (A) and Q may form a fused ring system. The X groups and n of formula (VI) are as defined above in formula (IV) and (V). In one embodiment, $Cp^A$ is selected from the group consisting of cyclopentadienyl, indenyl, tetrahydroindenyl, fluorenyl, substituted versions thereof, and combinations thereof.

In formula (VI), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include ethers, amines, phosphines, thioethers, alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect, the at least one metallocene catalyst component is an unbridged "half sandwich" metallocene represented by the formula (VII): $Cp^A MQ_q X_n$, wherein $Cp^A$ is defined as for the Cp groups in (IV) and is a ligand that is bonded to M; each Q is independently bonded to M; Q is also bound to $Cp^A$ in one embodiment; X is a leaving group as described above in (IV); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (VII), Q is selected from the group consisting of $ROO^-$, $RO—$, $R(O)—$, $—NR—$, $—CR_2—$, $—S—$, $—NR_2$, $—CR_3$, $—SR$, $—SiR_3$, $—PR_2$, $—H$, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In another embodiment, R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ alkyls, and $C_2$ to $C_{20}$ heteroallyl moieties.

By "derivatives thereof", it is meant any substitution or ring formation as described above; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine or chlorine; n is 1, 2 or 3.

It is contemplated that the metallocene catalyst components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The metallocene catalyst component may comprise any combination of any "embodiment" described herein.

Metallocene compounds are known in the art and any one or more may be utilized herein. Suitable metallocenes include, but are not limited to, all of the metallocenes disclosed and referenced in the US patents cited above, as well as those disclosed and referenced in U.S. Pat. Nos. 7,179,876; 7,169,864; 7,157,531; 7,129,302; 6,995,109; 6,958,306; 6,884,748; 6,689,847; US Patent publication 2007/0055028, and published PCT Applications WO 97/22635; WO 00/699/22; WO 01/30860; WO 01/30861; WO 02/46246; WO 02/50088; WO 04/026921; and WO 06/019494, all fully incorporated herein by reference. Additional catalysts suitable for use herein include those referenced in U.S. Pat. Nos. 6,309,997; 6,265,338; US Patent publication 2006/019925, and the following articles: Chem Rev 2000, 100, 1253; Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Exemplary metallocene compounds used herein are selected from the group consisting of:
bis(cyclopentadienyl)zirconium dichloride,
bis(n-butylcyclopentadienyl)zirconium dichloride,
bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride,
and (n-propyl cyclopentadienyl, pentamethyl cyclopentadienyl)zirconium dimethyl.

Support Material

In embodiments of the invention herein, the catalyst systems comprise a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably, $SiO_2$, $Al_2O_3$, or $SiO_2/Al_2O_3$.

It is preferred that the support material, most preferably, an inorganic oxide, has a surface area in the range of from about 10 $m^2/g$ to about 700 $m^2/g$, pore volume in the range of from about 0.1 cc/g to about 4.0 cc/g, and average particle size in the range of from about 5 μm to about 500 μm. More preferably, the surface area of the support material is in the range of from about 50 $m^2/g$ to about 500 $m^2/g$, pore volume of from about 0.5 cc/g to about 3.5 cc/g, and average particle size of from about 10 μm to about 200 μm. Most preferably, the surface area of the support material is in the range of from about 100 $m^2/g$ to about 400 $m^2/g$, pore volume from about 0.8 cc/g to about 3.0 cc/g, and average particle size is from about 5 μm to about 100 μm. The average pore size of the support material useful in the invention is in the range of from 10 to 1,000 Å, preferably, 50 to about 500 Å, and most preferably, 75 to about 350 Å. In some embodiments, the support material is a high surface area, amorphous silica (surface area ≥300 $m^2/gm$, pore volume ≥1.65 $cm^3/gm$), and is marketed under the tradenames of DAVISON 952 or DAVISON 955 by the Davison Chemical Division of W. R. Grace and Company, are particularly useful. In other embodiments, DAVIDSON 948 is used.

In some embodiments of this invention, the support material may be dry, that is, free of absorbed water. Drying of the support material can be achieved by heating or calcining at about 100° C. to about 1000° C., preferably, at least about 600° C. When the support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternately 0.19 to 19 wt %, alternately from 0.6 to 3.5 wt %, based upon the weight of the support.

The above two metal catalyst components described herein are generally deposited on the support material at a loading level of 10-100 micromoles of metal per gram of solid support; alternately 20-80 micromoles of metal per gram of solid support; or 40-60 micromoles of metal per gram of support. But greater or lesser values may be used provided that the total amount of solid complex does not exceed the support's pore volume.

Activators

The supported catalyst systems may be formed by combining the above two metal catalyst components with activators in any manner known from the literature including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventionaltype cocatalysts. Preferred activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

The terms "cocatalyst" and "activator" are used herein interchangeably and are defined to be any compound which can activate any one of the catalyst compounds described above by converting the neutral metal compound to a catalytically active metal compound cation.

Scavengers

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers useful in the invention include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_Z—Al—)_yO—)_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two metal compound components can be combined to form a mixed catalyst system.

The two or more metal compounds can be added together in a desired ratio when combined, contacted with an activator, or contacted with a support material or a supported activator. The metal compounds may be added to the mixture sequentially or at the same time.

More complex procedures are possible, such as addition of a first metal compound to a slurry including a support or a supported activator mixture for a specified reaction time, followed by the addition of the second metal compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal compound may be supported via contact with a support material for a reaction time. The resulting supported catalyst composition may then be mixed with mineral oil to form a slurry, which may or may not include an activator. The slurry may then be admixed with a second metal compound prior to introduction of the resulting mixed catalyst system to a polymerization reactor. The second metal compounds may be admixed at any point prior to introduction to the reactor, such as in a polymerization feed vessel or in-line in a catalyst delivery system.

The mixed catalyst system may be formed by combining a HMW metal compound (a metal compound useful for producing a high molecular weight polymer fraction) with a support and activator, desirably in a first diluent such as an alkane or toluene, to produce a supported, activated HMW metal compound. The supported activated HMW catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported HMW metal compound, followed by, or simultaneous to combining with a LMW metal compound (a metal compound useful for producing a low molecular weight polymer fraction), either in a diluent or as the dry solid compound, to form a supported activated mixed catalyst system ("mixed catalyst system"). The mixed catalyst system thus produced may be a supported and activated HMW metal compound in a slurry, the slurry comprising mineral or silicon oil, with a LMW metal compound that is not supported and not combined with additional activator, where the LMW metal compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils useful in the present invention are those that exclude moieties that are reactive with metallocene catalysts, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the HMW metal compound is combined with an activator and a first diluent to form a catalyst slurry that is then combined with a support material. Until such contact is made, the support particles are preferably, not previously activated. The HMW metal compound can be in any desirable form such as a dry powder, suspension in a diluent, solution in a diluent, liquid, etc. The catalyst slurry and support particles are then mixed thoroughly, in one embodiment at an elevated temperature, so that both the HMW metal compound and the activator are deposited on the support particles to form a support slurry. By following the procedures described herein for forming the mixed catalyst, to provide an activated, supported mixed catalyst system, a polymer, particularly a bimodal polyethylene, can be produced with a desirable combination of density, melt flow ratio and melt strength.

After the HMW metal compound and activator are deposited on the support, a LMW metal compound may then be combined with the supported HMW metal compound, wherein the LMW is combined with a diluent comprising mineral or silicon oil by any suitable means either before, simultaneous to, or after contacting the LMW metal compound with the supported HMW metal compound. In one embodiment, the HMW metal compound is isolated form the first diluent to a dry state before combining with the LMW metal compound. Preferably, the LMW metal compound is not activated, that is, not combined with any activator, before being combined with the supported HMW metal compound. The resulting solids slurry (including both the supported HMW and LMW metal compounds) is then preferably, mixed thoroughly at an elevated temperature.

A wide range of mixing temperatures may be used at various stages of making the mixed catalyst system. For example, in a specific embodiment, when the HMW metal compound and at least one activator, such as methylaluminoxane, are combined with a first diluent to form a mixture, the mixture is preferably, heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the HMW metal compound deposited thereto. The first diluent can then be removed from the first support slurry to provide a dried supported HMW catalyst compound. For example, the first diluent can be removed under vacuum or by nitrogen purge.

Next, the LMW metal compound is combined with the activated HMW metal compound in the presence of a diluent comprising mineral or silicon oil in one embodiment. Preferably, the LMW metal compound is added in a molar ratio to the HMW metal compound in the range from 1:1 to 3:1. Most preferably, the molar ratio is approximately 1:1. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

The first diluent is an aromatic or alkane, preferably, hydrocarbon diluent having a boiling point of less than 200° C. such as toluene, xylene, hexane, etc., may be removed from the supported HMW metal compound under vacuum or by nitrogen purge to provide a supported mixed catalyst system. Even after addition of the oil and/or the LMW (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator (s)) in one embodiment.

Polymerization Process

In embodiments herein, the invention relates to polymerization processes where monomer (such as ethylene), and, optionally, comonomer (such as hexene), are contacted with a supported catalyst system comprising a pyridyldiamido transition metal complex, a metallocene compound, an activator and a support material as described above.

Monomers useful herein include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment of the invention, the monomers comprise ethylene and, optional, comonomers comprising one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbomadiene, dicyclopentadiene, cyclopentene, cycloheptene, cyclooctene, cyclooctadiene, cyclododecene, 7-oxanorbornene, 7-oxanorbomadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbomadiene, and their respective homologs and derivatives.

In a preferred embodiment one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Preferred diolefin monomers useful in this invention include any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., divinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbomadiene, ethylidene norbornene, divinylbenzene, dicyclopentadiene or higher ring containing diolefins with or without substituents at various ring positions.

In a particularly preferred embodiment the process of the invention relates to the polymerization of ethylene and at least one comonomer having from 3 to 8 carbon atoms, preferably, 4 to 8 carbon atoms. Particularly, the comonomers are propylene, 1-butene, 4-methyl-1-pentene, 3-methyl-1-pentene, 1-hexene and 1-octene, the most preferred being 1-hexene, 1-butene and 1-octene.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Polyolefin Products

In a class of embodiments, the polyolefin products in this invention may comprise a unimodal, bimodal or multimodal molecular weight distribution (MWD). A bimodal polymer/resin is defined herein as a polymer/resin comprising two peaks in its molecular weight distribution, one of the two peaks having a higher average molecular weight (defined herein as the high molecular weight fraction) than the other fraction (defined as the low molecular weight fraction). A multimodal polymer/resin is defined as a polymer/resin comprising more than two peaks in the molecular weight distribution. The molecular weight distribution ($M_w/M_n$) of the invention generally in the range of from about 10 to about 60, preferably, from about 18 to about 50, for example, about 47.

Generally, the polymers of the invention comprise a high molecular weight fraction and a low molecular weight fraction. The polymers of the invention generally comprise from about 0.01 to about 25% of the high molecular weight fraction, preferably, from about 0.05 to about 20%, more preferably, from about 0.075 to about 15% of a very high molecular weight fraction, even more preferably, from about 0.1 to about 12.5% of a very high molecular weight fraction, wherein the high molecular weight fraction is determined by integrating the area under the molecular weight vs. dwt %/d Log M curve from molecular weight=1,000,000 to molecular weight=10,000,000.

"High molecular weight" is defined herein as being greater than about 1,000,000 g/mol, preferably, greater than about 1,500,000 g/mol, more preferably, greater than about 2,000,000 g/mol, and even more preferably, greater than about 3,000,000 g/mol. In one non-limiting embodiment, high molecular weight is greater than 5,000,000 g/mol. As described previously, "low molecular weight" is defined herein as being in the range of from about 40,000 to about 500,000 g/mol, preferably, from about 50,000 to about 300,000 g/mol, more preferably, from about 60,000 to about 200,000 g/mol, and even more preferably, from about 70,000 to about 150,000 g/mol. In one non-limiting embodiment, low molecular weight is about 100,000 g/mol.

Generally the high molecular weight fraction comprises a molecular weight at least 10 times greater than the low molecular weight fraction, preferably, at least 20 times greater than that of the low molecular weight fraction, more preferably, at least 30 times greater than that of the low molecular weight fraction, and even more preferably, at least 40 times greater than that of the low molecular weight fraction.

End Uses

The multi-modal polyolefin produced by the processes disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

General Synthesis of Pyridyldiamines

Outlined in Scheme 1 is the general synthetic route that was used to prepare the pyridyldiamines used herein with the exception of those listed above. In the Scheme, pin is pinacolate (2,3-dimethylbutane-2,3-diolate), Me is methyl, Dipp is 2,6-diisopropylphenyl. A detailed procedure is presented for the preparation of pyridyldiamine 6a. The pyridyldiamines 6b, 6e, 6f, 6g, 6h, 6i, 6j were prepared and isolated analogously to 6a and only characterization data are presented.

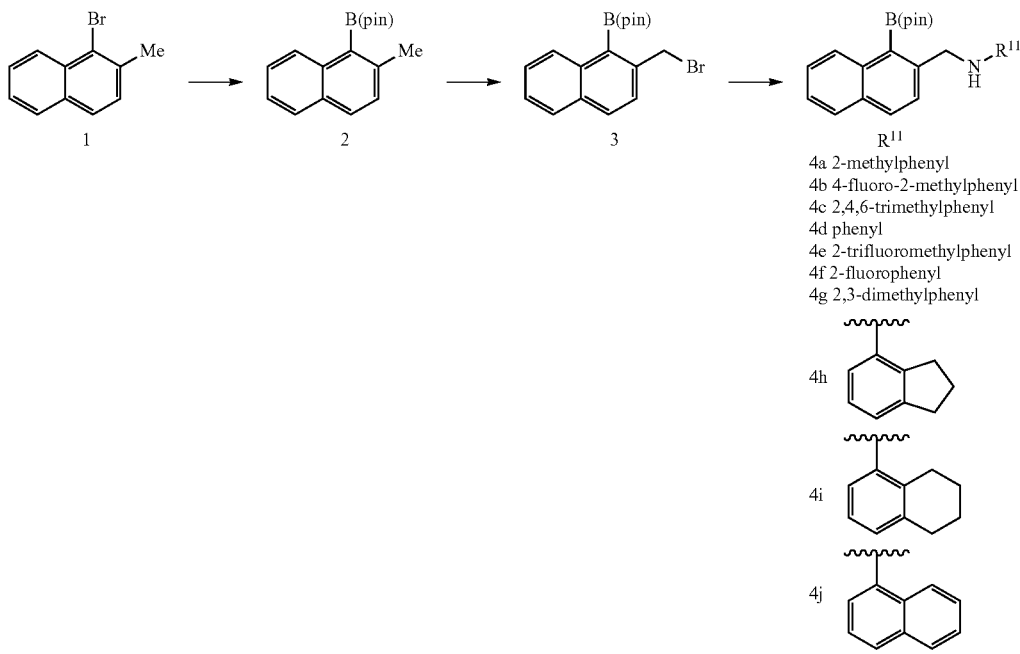

Scheme 1. Overview of pyridyl diamine synthesis routes

R[11]
4a 2-methylphenyl
4b 4-fluoro-2-methylphenyl
4c 2,4,6-trimethylphenyl
4d phenyl
4e 2-trifluoromethylphenyl
4f 2-fluorophenyl
4g 2,3-dimethylphenyl

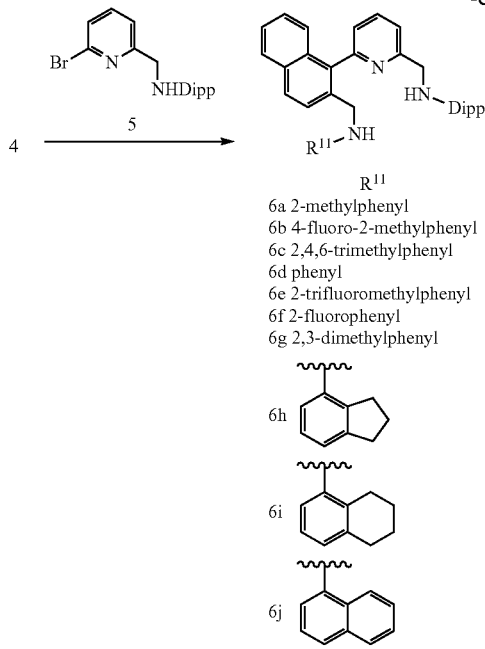

6a 2-methylphenyl
6b 4-fluoro-2-methylphenyl
6c 2,4,6-trimethylphenyl
6d phenyl
6e 2-trifluoromethylphenyl
6f 2-fluorophenyl
6g 2,3-dimethylphenyl

4,4,5,5-Tetramethyl-2-(2-methyl-1-naphthyl)-1,3,2-dioxaborolane (2)

1,2-Dibromoethane (~0.3 ml) was added to 6.10 g (250 mmol) magnesium turnings in 1000 cm$^3$ of THF. This mixture was stirred for 10 min, and then 55.3 g (250 mmol) of 1-bromo-2-methylnaphthalene was added for 1 h by vigorous stirring at room temperature for 3.5 hours. Thereafter, 46.5 g (250 mmol) of 2-isopropoxy-4,4,5,5-tetramethyl-1,3,2-dioxaborolane was added in one portion. The resulting mixture was stirred for 15 minutes and then was poured into 1,000 cm$^3$ of cold water. The product was extracted with 3×300 ml of ethyl acetate. The organic layer was separated, washed by water, brine, then dried over MgSO$_4$, and, finally, evaporated to dryness. The resulting white solid was washed by 2×75 ml of pentane and dried in vacuum. Yield 47.3 g (70%). Anal. calc. for $C_{17}H_{21}BO_2$: C, 76.14; H, 7.89. Found: C, 76.31; H, 8.02. $^1$H NMR (CDCl$_3$): 8.12 (m, 1H, 8-H), 7.77 (m, 1H, 5-H), 7.75 (d, J=8.4 Hz, 1H, 4-H), 7.44 (m, 1H, 7-H), 7.38 (m, 1H, 6-H), 7.28 (d, J=8.4 Hz, 1H, 3-H), 2.63 (s, 3H, 2-Me), 1.48 (s, 12H, CMe$_2$CMe$_2$).

2-[2-(Bromomethyl)-1-naphthyl]-4,4,5,5-tetramethyl-1,3,2-dioxaborolane (3)

A mixture of 47.3 g (176 mmol) of 4,4,5,5-tetramethyl-2-(2-methyl-1-naphthyl)-1,3,2-dioxaborolane, 33.0 g (185 mmol) of NBS (N-Bromosuccinimide) and 0.17 g of benzoyl peroxide in 340 ml of CCl$_4$ was stirred at 75° C. for 14 hours. Thereafter the reaction mixture was cooled to room temperature, filtered through glass frit (G3), and the filtrate was evaporated to dryness. This procedure gave 62.2 g (99%) of beige solid. Anal. calc. for $C_{17}H_{20}BBrO_2$: C, 58.83; H, 5.81. Found: C, 59.00; H, 5.95. $^1$H NMR (CDCl$_3$): 8.30 (m, 1H, 8-H), 7.84 (d, J=8.3 Hz, 1H, 4-H), 7.79 (m, 1H, 5-H), 7.43-7.52 (m, 3H, 3,6,7-H), 4.96 (s, 2H, CH$_2$Br), 1.51 (s, 12H, CMe$_2$CMe$_2$).

2-Methyl-N-((1-(4,4,5,5-tetramethyl-1,3,2-dioxaborolan-2-yl)naphthalen-2-yl)methyl)aniline (4a)

A mixture of 10.8 g (101 mmol) of 2-methylaniline, 23.3 g (67.0 mmol) of 2-[2-(bromomethyl)-1-naphthyl]-4,4,5,5-tetramethyl-1,3,2-dioxaborolane (compound 3), and 10.2 g (74.0 mmol) of K$_2$CO$_3$ in 450 mL of DMF was stirred for 12 h at 80° C. The resulting mixture was poured into 1000 mL of water. The product was extracted with 3×200 ml of ethyl acetate. The combined extract was dried over MgSO$_4$ and then evaporated to dryness. The residue was re-crystallized from a mixture of 200 ml of hexane and 10 ml of ethyl acetate. Yield 15.7 g (63%) of a brown crystalline powder. Anal. calc. for $C_{24}H_{28}BNO_2$: C, 77.22; H, 7.56; N, 3.75. Found: C, 77.33; H, 7.67; N, 3.59. $^1$H NMR (CDCl$_3$): δ 8.20 (m, 1H, 8-H in naphthyl), 7.84 (d, J=8.5 Hz, 1H, 4-H in naphthyl), 7.82 (m, 1H, 5-H in naphthyl), 7.43-7.52 (m, 3H, 3,6,7-H in naphthyl), 7.14 (m, 1H, 5-H in o-tolyl), 7.06 (m, 1H, 3-H in o-tolyl), 6.79 (m, 1H, 6-H in o-tolyl), 6.68 (m, 1H, 4-H in o-tolyl), 4.53 (s, 2H, CH2N), 3.95 (br.s, 1H, NH), 2.11 (s, 3H, 2-Me in o-tolyl), 1.36 (s, 12H, CMe2CMe2).

N-[(6-Bromopyridin-2-yl)methyl]-2,6-diisopropylaniline (5)

A mixture of 25.0 g (134 mmol) of 6-bromopyridine-2-carbaldehyde, 23.8 g (134 mmol) of 2,6-diisopropylaniline and 1.15 g (6.70 mmol) of TsOH in 600 ml of toluene was refluxed for 15 min using a Soxhlet apparatus filled with CaCl$_2$. The obtained solution was evaporated to dryness, and the residue was re-crystallized from 100 ml of methanol to give the imine product N-[(1E)-(6-bromopyridin-2-yl)methylene]-2,6-diisopropylaniline as a yellow crystalline solid (23.9 g). In argon atmosphere, a mixture of 22.4 g (65.0 mmol) of N-[(1E)-(6-bromopyridin-2-yl)methylene]-2,6-diisopropylaniline, 6.53 g (104 mmol) of NaBH$_3$CN, 2 ml of AcOH and 430 ml of methanol was refluxed for 12 h. The obtained mixture was cooled, poured into 1,000 ml of water, and then extracted with 3×200 ml of ethyl acetate. The combined extract was dried over MgSO$_4$ and evaporated to dryness. The residue was purified by flash chromatography on silica gel 60 (40-63 μm, eluent: hexane-ethyl acetate=10: 1, vol.). Yield 19.8 g (43%) of a yellow oil. Anal. calc. for C$_{18}$H$_{23}$BrN$_2$: C, 62.25; H, 6.68; N, 8.07. Found: C, 62.40; H, 6.77; N, 7.96. $^1$H NMR (CDCl$_3$): δ 7.50 (m, 1H, 4-H in 6-bromopyridyl), 7.38 (m, 1H, 5-H in 6-bromopyridyl), 7.28 (m, 1H, 3-H in 6-bromopyridyl), 7.01-7.11 (m, 3H, 3,4,5-H in 2,6-diisopropylphenyl), 4.16 (s, 2H, CH$_2$N), 3.93 (br.s, 1H, NH), 3.31 (sep, J=6.9 Hz, 2H, CHMe$_2$), 1.22 (d, J=6.9 Hz, 12H, CHMe$_2$).

2,6-Diisopropyl-N-{[6-(2-{[(2-methylphenyl)amino]methyl}-1-naphthyl)pyridin-2-yl]methyl}aniline (6a)

A mixture of 27.2 g (95.0 mmol) of Na$_2$CO$_3$×10H$_2$O, 410 ml of water and 120 ml of methanol was purged with argon for 30 min. The obtained solution was added to a mixture of 14.2 g (38.0 mmol) of 2-methyl-N-{[1-(4,4,5,5-tetramethyl-1,3,2-dioxaborolan-2-yl)-2-naphthyl]methyl}aniline (4a), 13.3 g (38.0 mmol) of N-[(6-bromopyridin-2-yl)methyl]-2,6-diisopropylaniline, and 2.19 g (1.90 mmol) of Pd(PPh$_3$)$_4$ in 500 ml of toluene. This mixture was stirred for 12 hours at 70° C., and then cooled to room temperature. The organic layer was separated; the aqueous layer was extracted with 3×200 ml of ethyl acetate. The combined organic extract was washed with brine, dried over Na$_2$SO$_4$ and evaporated to dryness. The residue was purified by flash chromatography on silica gel 60 (40-63 μm, eluent: hexane-ethyl acetate-triethylamine=100:20:1, vol.). Yield 10.1 g (52%) of a yellow powder. Anal. calc. for C$_{36}$H$_{39}$N$_3$: C, 84.17; H, 7.65; N, 8.18. Found: C, 84.28; H, 7.73; N, 8.09. $^1$H NMR (CDCl$_3$): δ 7.91 (d, J=8.4 Hz, 1H, 4-H in naphthyl), 7.89 (m, 1H, 8-H in naphthyl), 7.79 (m, 1H, 4-H in Py), 7.66 (d, J=8.4 Hz, 1H, 3-H in naphthyl), 7.47 (m, 1H, 7-H in naphthyl), 7.36-7.42 (m, 4H, 3,5-H in Py and 5,6-H in naphthyl), 7.04-7.10 (m, 3H, 3,5-H in ortho-tolyl and 4-H in 2,6-diisopropylphenyl), 7.01 (m, 2H, 3,5-H in 2,6-diisopropylphenyl), 6.61 (m, 1H, 4-H in ortho-tolyl), 6.52 (m, 1H, 6-H in ortho-tolyl), 4.22-4.35 (m, 4H, CH$_2$N), 4.02 (br.s, 1H, NH), 3.93 (br.s, 1H, NH), 3.28 (sept, J=6.8 Hz, 2H, CHMe$_2$), 2.09 (s, 3H, Me in ortho-tolyl), 1.16 (d, J=6.8 Hz, 6H, CHMeMe'), 1.14 (d, J=6.8 Hz, 6H, CHMeMe').

N-{[1-(6-{[(2,6-Diisopropylphenyl)amino]methyl}pyridin-2-yl)-2-naphthyl]methyl}-4-fluoro-2-methylaniline (6b)

Anal. calc. for C$_{36}$H$_{38}$FN$_3$: C, 81.32; H, 7.20; N, 7.90. Found: C, 80.98; H, 7.14; N, 7.82.
$^1$H NMR (CDCl$_3$): δ 7.91 (d, J=8.5 Hz, 1H), 7.89 (m, 1H), 7.80 (m, 1H), 7.64 (d, J=8.5 Hz, 1H), 7.35-7.50 (m, 5H), 7.03-7.11 (m, 3H), 6.75 (m, 1H), 6.71 (m, 1H), 6.42 (dd, J=8.7 Hz, J=4.6 Hz, 1H), 4.28 (m, 2H), 4.20 (m, 2H), 3.97 (br.s, 1H), 3.89 (br.s, 1H), 3.26 (sept, J=6.8 Hz), 2.08 (s, 3H), 1.16 (d, J=6.9 Hz, 6H), 1.15 (d, J=6.9 Hz, 6H).

2,6-Diisopropyl-N-({6-[2-({[2-(trifluoromethyl)phenyl]amino}methyl)-1-naphthyl]Pyridin-yl}methyl) aniline (6e)

Anal. calc. for C$_{36}$H$_{36}$F$_3$N$_3$: C, 76.17; H, 6.39; N, 7.40. Found: C, 75.92; H, 6.30; N, 7.24.
$^1$H NMR (CDCl$_3$): δ 7.92 (d, J=8.6 Hz, 1H), 7.89 (m, 1H), 7.82 (m, 1H), 7.64 (d, J=8.6 Hz, 1H), 7.36-7.51 (m, 6H), 7.24 (m, 1H), 7.04-7.12 (m, 3H), 6.68 (m, 1H), 6.64 (m, 1H), 4.80 (m, 1H), 4.26-4.39 (m, 4H), 4.11 (br.s, 1H), 3.31 (sept, J=6.75 Hz, 2H), 1.17 (d, J=6.8 Hz, 6H), 1.16 (d, J=6.8 Hz, 6H).

N-{[6-(2-{[(2-Fluorophenyl)amino]methyl}-1-naphthyl)pyridin-2-yl]methyl}-2,6-diisopropylaniline (6f)

Anal. calc. for C$_{35}$H$_{36}$FN$_3$: C, 81.20; H, 7.01; N, 8.12. Found: C, 80.98; H, 7.16; N, 8.30.
$^1$H NMR (CDCl$_3$): δ 7.91 (d, J=8.4 Hz, 1H), 7.89 (m, 1H), 7.81 (m, 1H), 7.67 (d, J=8.4 Hz, 1H), 7.45-7.50 (m, 2H), 7.35-7.42 (m, 3H), 7.04-7.12 (m, 3H), 6.87-6.95 (m, 2H), 6.54-6.64 (m, 2H), 4.40 (br.s, 2H), 4.31 (m, 2H), 4.27 (m, 2H), 3.30 (sept, J=6.8 Hz, 2H), 1.17 (d, J=6.8 Hz, 6H), 1.16 (d, J=6.8 Hz, 6H).

N-{[1-(6-{[(2,6-Diisopropylphenyl)amino]methyl}pyridin-2-yl)-2-naphthyl]methyl}-2,3-dimethylaniline (6g)

Anal. calc. for C$_{37}$H$_{41}$N$_3$: C, 84.21; H, 7.83; N, 7.96. Found: C, 84.37; H, 7.99; N, 7.89.
$^1$H NMR (CDCl$_3$): δ 7.91 (d, J=8.2 Hz, 1H, 4-H in naphthyl), 7.89 (m, 1H, 8-H in naphthyl), 7.79 (m, 1H, 4-H in Py), 7.67 (d, J=8.6 Hz, 1H, 3-H in naphthyl), 7.48 (m, 1H, 7-H in naphthyl), 7.37-7.45 (m, 4H, 3,5-H in Py and 5,6-H in naphthyl), 7.04-7.11 (m, 3H, 3,4,5-H in 2,6-diisopropylphenyl), 6.93 (m, 1H, 5-H in 2,3-dimethylphenyl), 6.56 (m, 1H, 4-H in 2,3-dimethylphenyl), 6.44 (m, 1H, 6-H in 2,3-dimethylphenyl), 4.23-4.36 (m, 4H, 2,3-dimethylphenyl-NHCH$_2$ and 2,6-diisopropylphenyl-NHCH$_2$), 4.02 (br.s, 1H, NH), 3.98 (br.s, 1H, NH), 3.29 (sept, J=6.8 Hz, 2H, CHMe$_2$), 2.24 (s, 3H, 3-Me in 2,3-dimethylphenyl), 2.01 (s, 3H, 2-Me in 2,3-dimethylphenyl), 1.17 (d, J=6.8 Hz, 6H, CHMeMe'), 1.15 (d, J=6.8 Hz, 6H, CHMeMe').

N-{[1-(6-{[(2,6-Diisopropylphenyl)amino]methyl}pyridin-2-yl)-2-naphthyl]methyl}indan-4-amine (6h)

Anal. calc. for C$_{38}$H$_{41}$N$_3$: C, 84.56; H, 7.66; N, 7.79. Found: C, 84.49; H, 7.75; N, 7.62.
$^1$H NMR (CDCl$_3$): δ 7.90 (d, J=8.5 Hz, 1H, 4-H in naphthyl), 7.88 (m, 1H, 8-H in naphthyl), 7.79 (m, 1H, 4-H in Py), 7.67 (d, J=8.5 Hz, 1H, 3-H in naphthyl), 7.35-7.49 (m, 5H, 3,5-H in Py and 5,6,7-H in naphthyl), 7.03-7.10 (m, 3H, 3,4,5-H in 2,6-diisopropylphenyl), 6.97 (m, 1H, 3-H in indanyl), 6.60 (m, 1H, 4-H in indanyl), 6.35 (m, 1H, 2-H in indanyl), 4.21-4.36 (m, 4H, indanyl-NHCH$_2$ and 2,6-diisopropylphenyl-NHCH$_2$), 4.04 (br.s, 1H, NH), 3.88 (br.s, 1H, NH), 3.28 (sept, J=6.8 Hz, 2H, CHMe$_2$), 2.86 (m, 2H, 5,5'-H in indanyl), 2.62 (m, 2H, 7,7'-H in indanyl), 2.03 (m, 2H, 6,6'-H in indanyl), 1.15 (d, J=6.8 Hz, 6H, CHMeMe'), 1.14 (d, J=6.8 Hz, 6H, CHMeMe').

N-{[1-(6-{[(2,6-Diisopropylphenyl)amino]methyl}pyridin-2-yl)-2-naphthyl]methyl}-5,6,7,8-tetrahydronaphthalen-1-amine (6i)

Anal. calc. for C$_{39}$H$_{43}$N$_3$: C, 84.59; H, 7.83; N, 7.59. Found: C, 84.44; H, 7.69; N, 7.65.
$^1$H NMR (CDCl$_3$): δ 7.90 (d, J=8.4 Hz, 1H, 4-H in naphthyl), 7.88 (m, 1H, 8-H in naphthyl), 7.78 (m, 1H, 4-H in Py), 7.66 (d, J=8.4 Hz, 1H, 3-H in naphthyl), 7.36-7.49 (m, 5H, 3,5-H in Py and 5,6,7-H in naphthyl), 7.02-7.10 (m, 3H, 3,4,5-H in 2,6-diisopropylphenyl), 6.93 (m, 1H, 3-H in tetrahydronaphthyl), 6.46 (m, 1H, 4-H in tetrahydronaphthyl), 6.37 (m, 1H, 2-H in tetrahydronaphthyl), 4.22-4.36 (m, 4H, tetrahydronaphthyl-NHCH₂ and 2,6-diisopropylphenyl-NHCH₂), 4.06 (br.s, 1H, NH), 3.91 (br.s, 1H, NH), 3.28 (sept, J=6.7 Hz, 2H, CHMe₂), 2.70 (m, 2H, 5,5'-H in tetrahydronaphthyl), 2.36 (m, 2H, 8,8'-H in tetrahydronaphthyl), 1.79 (m, 2H, 7,7'-H in tetrahydronaphthyl), 1.70 (m, 2H, 6,6'-H in tetrahydronaphthyl), 1.15 (d, J=6.7 Hz, 6H, CHMeMe'), 1.14 (d, J=6.7 Hz, 6H, CHMeMe').

N-{[1-(6-{[(2,6-Diisopropylphenyl)amino]methyl}pyridin-2-yl)-2-naphthyl]methyl}naphthalen-1-amine (6j)

Anal. calc. for $C_{39}H_{39}N_3$: C, 85.21; H, 7.15; N, 7.64. Found: C, 85.36; H, 7.32; N, 7.42.

¹H NMR (CDCl₃): δ 7.92 (d, J=8.4 Hz, 1H, 4-H in naphthylidene), 7.90 (m, 1H, 8-H in naphthylidene), 7.70-7.78 (m, 4H, 4-H in Py and 3,5-H in naphthylidene and 8-H in naphthyl), 7.17-7.51 (m, 9H, 3,5-H in Py and 6,7-H in naphthylidene and 3,4,5,6,7-H in naphthyl), 7.01-7.08 (m, 3H, 3,4,5-H in 2,6-diisopropylphenyl), 6.53 (m, 1H, 2-H in naphthyl), 4.91 (br.s, 1H, NH), 4.38 (m, 2H, CH₂NH-2,6-diisopropylphenyl), 4.23 (m, 2H, CH₂NH-naphthyl), 3.99 (br.s, 1H, NH), 3.23 (sept, J=6.7 Hz, 2H, CHMe₂), 1.13 (d, J=6.7 Hz, 6H, CHMeMe'), 1.10 (d, J=6.7 Hz, 6H, CHMeMe').

Synthesis of Pyridyl Diamide Metal Complexes

Figure 2A:
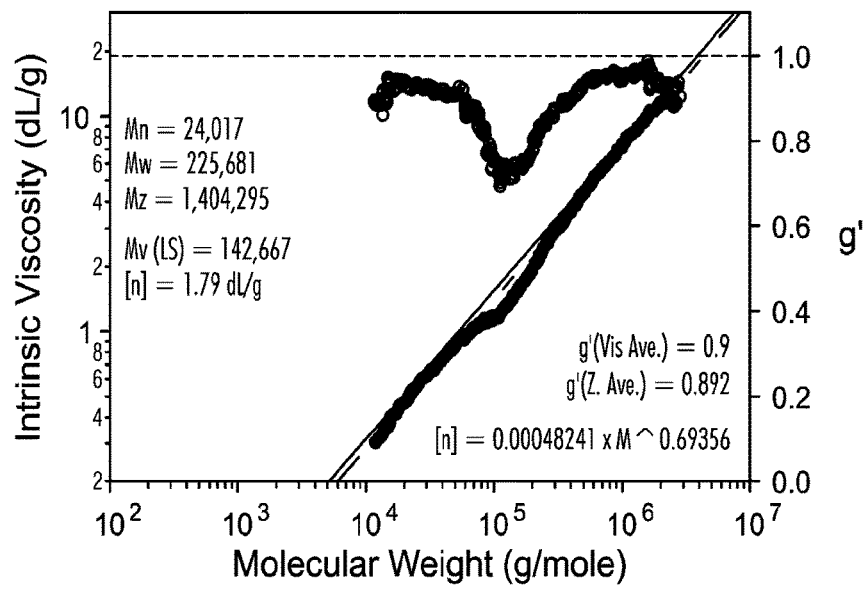
FIG. 2a presents GPC 3D graphs for a non-limiting example of polyethylene generated in LGPR test.
Figure 2A:
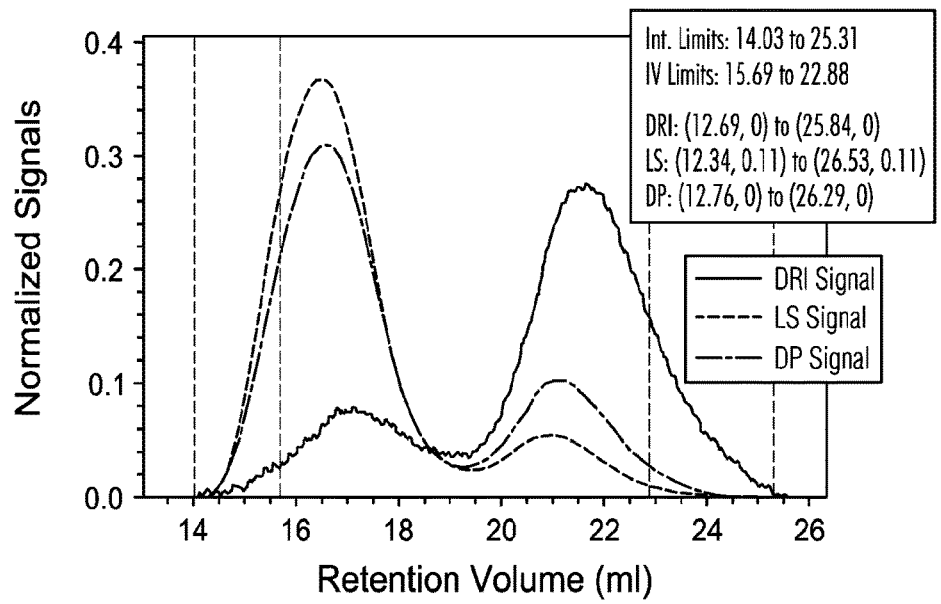

Shown below in Scheme 2 and also in FIG. 2 are pyridyldiamide complexes and an outline of the general synthetic route used to prepare them. A detailed synthesis is presented for complex A1. All other complexes were prepared analogously to complex A1.

Scheme 2. Synthesis of pyridyladiamide complexes

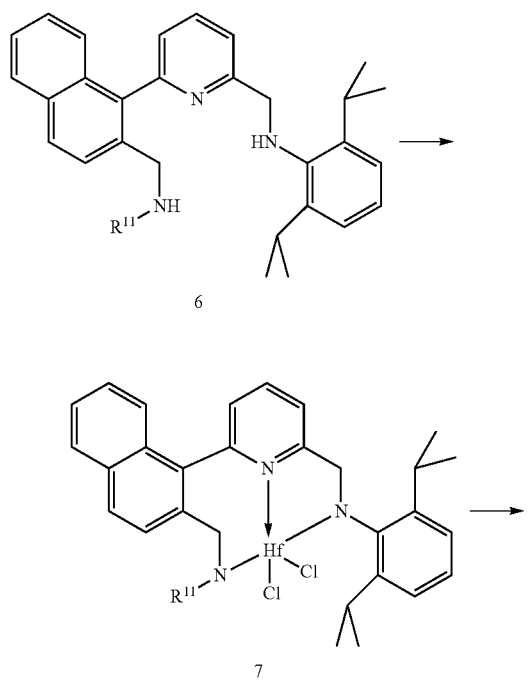

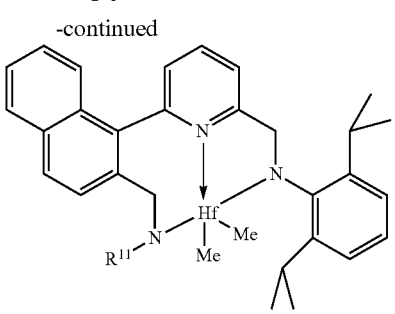

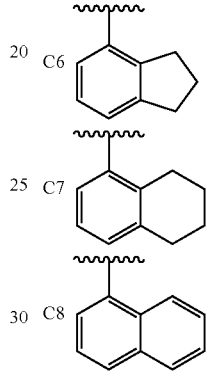

R¹¹
A1 2-methylphenyl
A2 4-fluoro-2-methylphenyl
C1 2,4,6-trimethylphenyl
C2 phenyl
C3 2-trifluoromethylphenyl
C4 2-fluorophenyl
C5 2-dimethyphenyl C6 [indanyl]

C7 [tetrahydronaphthyl]

C8 [naphthyl]

Complex A1.

Toluene (50 mL) was added to the pyridyldiamine 6a (2.07 g, 4.03 mmol) and Hf(NMe₂)₂Cl₂(dme) (dme=1,2-dimethoxyethane) (1.73 g, 4.03 mmol) to form a yellow solution. The mixture was heated to 95° C. in the dark. After 2.5 hours the suspension was cooled to ambient temperature for a couple of hours. The resulting solid was collected on a glass frit and washed with toluene (2×5 mL) and then dried under reduced pressure to afford 2.4 grams of the intermediate dichloride derivative as a white solid. Proton NMR spectroscopy indicated the presence of 0.46 equivalents of toluene. This dichloride derivative (2.40 g, 2.99 mmol) was combined with CH₂Cl₂ (100 mL) and cooled to −40° C. A solution of Me₂Mg (15.3 mL, 3.59 mmol) in Et₂O was added dropwise. After 0.5 h the mixture was allowed to warm to ambient temperature. The volatiles were then evaporated and the residue was extracted with CH₂Cl₂ and filtered. The volatiles were removed to afford the crude product that was washed with pentane. Drying under reduced pressure afforded product as a white solid (2.01 g, 93.3%). ¹H NMR (400 MHz, CD₂Cl₂): 8.2-6.9 (aryls, 16H), 5.07 (AB quartet, Δυ=130 Hz, J=20 Hz), 4.49 (br, 1H), 4.14 (br, 1H), 3.74 (sept, 1H), 3.02 (br sept 1H), 2.30 (br, 3H), 1.4-1.0 (m, 11H), 0.89 (t, 2H), 0.55 (d, 3H), −0.80 (s, 3H), −1.13 (s, 3H).

Complex A2.

¹H NMR (500 MHz, CD₂Cl₂): 8.09 (br, 2H), 7.97 (d, 1H), 7.75-7.48 (m, 6H), 7.1-6.94 (m, 5H), 6.78 (br, 1H), 5.20 (d, 1H), 4.90 (br d, 1H), 4.5-3.7 (v br, 2H), 3.73 (sept, 1H), 3.1-1.8 (v br, 3H), 1.17 (d, 6H), 1.09 (d, 3H), 0.63 (br s, 3H), −0.80 (s, 3H), −1.14 (br s, 3H).

Complex C3.

NMR characterization data is broad and complex.

Complex C4.

$^1$H NMR (400 MHz, CD$_2$Cl$_2$): 8.2-6.9 (m, 15H), 5.03 (AB quartet, 2H), 4.42 (AB quartet, 2H), 3.74 (sept, 1H), 3.07 (sept, 1H), 1.15 (m, 9H), 0.62 (d, 3H), −0.65 (s, 3H), −1.09 (s, 3H).

Complex C5.

Proton NMR data is complex and broad and suggests the presence of multiple rotational isomers.

Complex C6.

$^1$H NMR (400 MHz, CD$_2$Cl$_2$): 8.2-7.5 (m, 9H), 7.1-6.7 (m, 6H), 5.01 (AB quartet, 2H), 4.38 (AB quartet, 2H), 3.73 (sept, 1H), 2.9 (m, 4H), 2.6 (m, 1H), 2.01 (m, 2H), 1.16 (d, 3H), 1.10 (m, 6H), 0.51 (d, 3H), −0.70 (s, 3H), −1.14 (s, 3H).

Complex C7.

Proton NMR data is complex and broad and suggests the presence of multiple rotational isomers.

Complex C8.

Proton NMR data is complex and broad and suggests the presence of multiple rotational isomers.

Preparation of Supported Catalyst Systems

The supported catalyst systems comprising Complex A1 and bis(1-methyl-3-n-butylcyclopentadienyl)zirconium dichloride (ECl$_2$) are used herein as examples describing the preparation processes.

Example 1

Preparation Supported Catalyst System I Having Non-Fluorided Silica Calcined at 600° C. (Complex A1/ECl$_2$=1:1)

(i) Preparation of Combination of MAO/Silica (sMAO-D948-600° C.)

DAVIDSON 948 silica (40.7 g) calcined at 600° C. was slurried in 200 mL of toluene. MAO (71.4 g of a 30 wt % toluene solution, 351.1 mmol of Al) was added slowly to the slurry. The slurry was then heated to 80° C. and stirred for 1 hr. The slurry was filtered, washed three times with 70 mL of toluene and once with pentane. The solid was dried under vacuum overnight to give a 60.7 g of free flowing white solid.

(ii) Preparation of Supported Catalyst System I sMAO-D948-600° C. (48.3 g) was slurried in 150 mL of toluene. ECl$_2$ (418 mg, 0.9660 mmol) and Complex A1 (733 mg, 0.966 mmol) were added together in a molar ratio 1:1 into a vial and dissolved in 10 mL of toluene. The catalyst solution was added to the sMAO-D948-600° C. slurry. The catalyst vial was washed out with an additional 20 mL of toluene and added to the celstir. The catalyst stirred for 4 hr 15 min. The slurry was filtered, washed three times with 60 mL of toluene and washed twice with pentane. The solid was dried under vacuum overnight to give a 47.9 g of a yellow powder.

Example 2

Preparation of Supported Catalyst System II Having Fluorided Silica Calcined at 200° C. (Complex A1/ECl$_2$=1:1)

(i) Preparation of Fluorided Silica (F-D948-200° C.)

DAVISION 948 Silica (142.50 g) is tumbled with (NH$_4$)$_2$SiF$_6$ (7.50 g, 5 wt %) for 1 hour. The silica was then placed in a tube furnace and fluidized with 1.1 SLPM (standard liters per minute) of nitrogen. The tube was heated at 25° C./hr to 150° C., held for 4 hours, then ramped at 50° C./hr to 200° C. and held there for another 4 hours. The tube was allowed to cool to ambient temperature. 139.1 g of white powder was collected under an inert atmosphere.

(ii) Preparation of Combination of MAO/Fluorided Silica (sMAO-F-D948-200° C.)

MAO (37.6 g of 30% wt in toluene) was added to a celstir along with 100 mL of toluene. F-D948-200° C. (29.9 g) was added to the slurry in 5 g increments. The reaction stirred for 10 minutes at room temperature and was then heated to 100° C. for 3 hours. The solid was filtered, washed twice with 80 mL of toluene, washed twice with pentane, then dried under vacuum overnight. 39.6 g of free flowing white solid was collected.

(iii) Preparation of Supported Catalyst System II sMAO-F-D948-200° C. (1.0 g) was charged into a 20 ml glass vial. A toluene stock solution (4.0 g) containing Complex A1 (20 μmol) and ECl$_2$ (20 μmol) was added to the vial. The resulting slurry was filtered through a 25 ml Optichem disposable polyethylene frit and rinsed with 3 g toluene for 2 times and 3 g pentane for 3 times. The supported catalyst was dried in-vacuo.

Example 3

Preparation of Supported Catalyst System III Having Fluorided Silica Calcined at 200° C. (Complex A1/ECl$_2$=1:3)

(i) Preparation of Fluorided Silica (F-D948-200° C.)

DAVISON 948 Silica (142.50 g) is tumbled with (NH$_4$)$_2$SiF$_6$ (7.5 g, 5 wt %) for 1 hour. The silica was then placed in a tube furnace and fluidized with 1.1 SLPM (standard liters per minute) of nitrogen. The tube was heated at 25° C./hr. to 150° C., held for 4 hours, then ramped at 50° C./hr. to 200° C. and held there for another 4 hours. The tube was allowed to cool to ambient temperature. 139.1 g of white powder was collected under an inert atmosphere.

(ii) Preparation of Combination of MAO/Fluorided Silica (sMAO-F-D948-200° C.)

MAO (37.6 g of 30 wt % in toluene) was added to a celstir along with 100 mL of toluene. F-D948-200° C. (29.9 g) was added to the slurry in 5 g increments. The reaction stirred for 10 minutes at room temperature and was then heated to 100° C. for 3 hours. The solid was filtered, washed twice with 80 mL of toluene, washed twice with pentane, then dried under vacuum overnight. 39.6 g of free flowing white solid was collected.

(iii) Preparation of Supported Catalyst System III sMAO-F-D948-200° C. (1.0 g) was charged into a 20 ml glass vial. A toluene stock solution (4.0 g) containing Complex A1 (10 μmol) and ECl$_2$ (30 μmol) was added to the vial. The resulting slurry was filtered through a 25 ml Optichem disposable polyethylene frit and rinsed with 3 g toluene for 2 times and 3 g pentane for 3 times. The supported catalyst was dried in-vacuo.

Polymerization of Olefin Monomers

Example 4

Slurry Phase Polymerization of Ethylene and 1-Hexene in a Parallel Reactor-High Throughput Polymerization Test (HTPT) of Ethylene and 1-Hexene Ethylene and 1-hexene copolymerizations were carried out in a parallel pressure reactor, as generally described in U.S. Pat. Nos. 6,306,658; 6,455,316; 6,489,168; WO 00/09255; and Murphy et al., J. Am. Chem. Soc., 2003, 125, pp. 4306-4317; each of which is fully incorporated herein by reference for US purposes. Although the specific quantities, temperatures, solvents, reactants, reactant ratios, pressures, and other variables are frequently changed from one polymerization run to the next, the following describes a typical polymerization performed in a parallel pressure reactor. A pre-weighed glass vial insert and disposable stirring paddle were fitted to each reaction vessel of the reactor.

The reactor was prepared as described above, and then purged with ethylene. Isohexane, 1-hexene and tri-n-octylaluminum (TnOAl) were added via syringe at room temperature and atmospheric pressure. The reactor was then brought to process temperature (85° C.) and charged with ethylene to process pressure (130 psig=896 kPa) while stirring at 800 RPM. The supported catalyst system II prepared in Example 2 and the supported catalyst system III prepared in Example 3 (100 µL of a 3 mg/mL toluene slurry, unless indicated otherwise) were added via syringe with the reactor at process conditions. TnOAl was used as 200 µL of a 20 mmol/L in isohexane solution. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi $O_2$/Ar (5 mol % $O_2$) gas mixture to the autoclaves for approximately 30 seconds. The polymerizations were quenched after a predetermined cumulative amount of ethylene had been added or for a maximum of 4,520 minutes polymerization time. The reactors were cooled and vented. The polymer was isolated after the solvent was removed in-vacuo. Catalyst activity is reported as kilograms of polymer per mol transition metal compound per hour of reaction time (kg/mol·hr). The results of polymerization are shown in Table 2.

The resultant polymer was analyzed by Rapid GPC (see below) to determine the molecular weight, by FT-IR (see below) to determine percent of 1-hexene incorporation.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm*7.5 mm linear columns, each containing PLgel 10 µm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector. The molecular weights presented are relative to linear polystyrene standards and are uncorrected.

TABLE 2

Slurry Phase Polymerization of Ethylene and 1-Hexene in HTPT

| Supported Catalyst | Cat. Composition | C6 (mol %) | Activity (kg/mol M * h) | Mw (k) | PDI | C6 wt % |
|---|---|---|---|---|---|---|
| Fluorided | ComplexA1 | 6 | 21549 | 2100 | 3.8 | 5.6 |
| Fluorided | ComplexA1 | 11 | 55637 | 2678 | 3.4 | 6.6 |
| HP100 control | $ECl_2$ | 6 | 17812 | 440 | 2.2 | 2.5 |
| HP100 control | $ECl_2$ | 11 | 22402 | 438 | 2.0 | 4.0 |
| II-fluorided | ComplexA1/$ECl_2$ = 1:1 | 6 | 19952 | 735 | 3.3 | 3.2 |
| II-fluorided | ComplexA1/$ECl_2$ = 1:1 | 11 | 23929 | 783 | 3.5 | 4.3 |
| III-fluorided | ComplexA1/$ECl_2$ = 1:3 | 6 | 23555 | 485 | 2.5 | 3.0 |
| III-fluorided | ComplexA1/$ECl_2$ = 1:3 | 11 | 27365 | 478 | 2.2 | 4.2 |

Run conditions: isohexane as solvent, 85° C., 130 psi ethylene pressure, 30 µl (6 mol % in feed) or 60 µl (11 mol % in feed) of 1-hexene, no hydrogen added.

As shown from Table 2, the ethylene-hexene copolymer catalyzed by the first catalyst component alone exhibited a higher molecular weight than that of the second catalyst component. The difference in molecular weight of resulting polymer is helpful to produce multi-modal polymers. The resulting polymer catalyzed by the combination of the two catalyst components exhibited a boarder molecular weight distribution.

Example 5

Figure 2B:
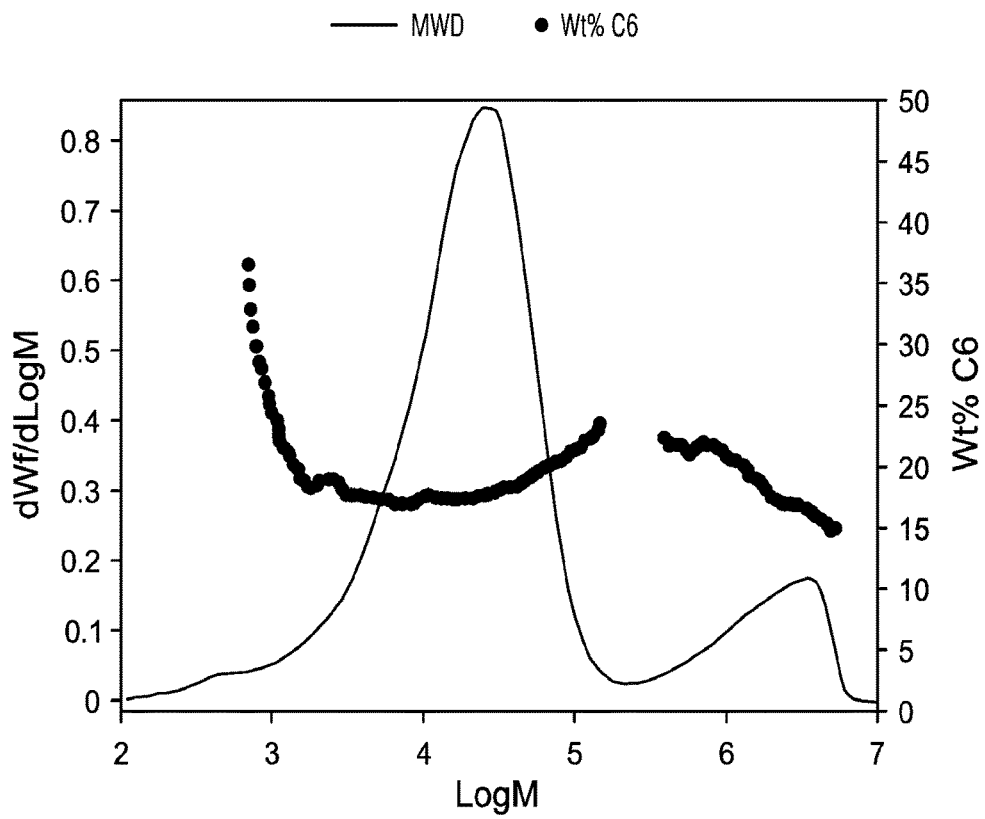
FIG. 2b presents GPC-IR graphs for a non-limiting example of polyethylene generated in LGPR test.
Figure 3:
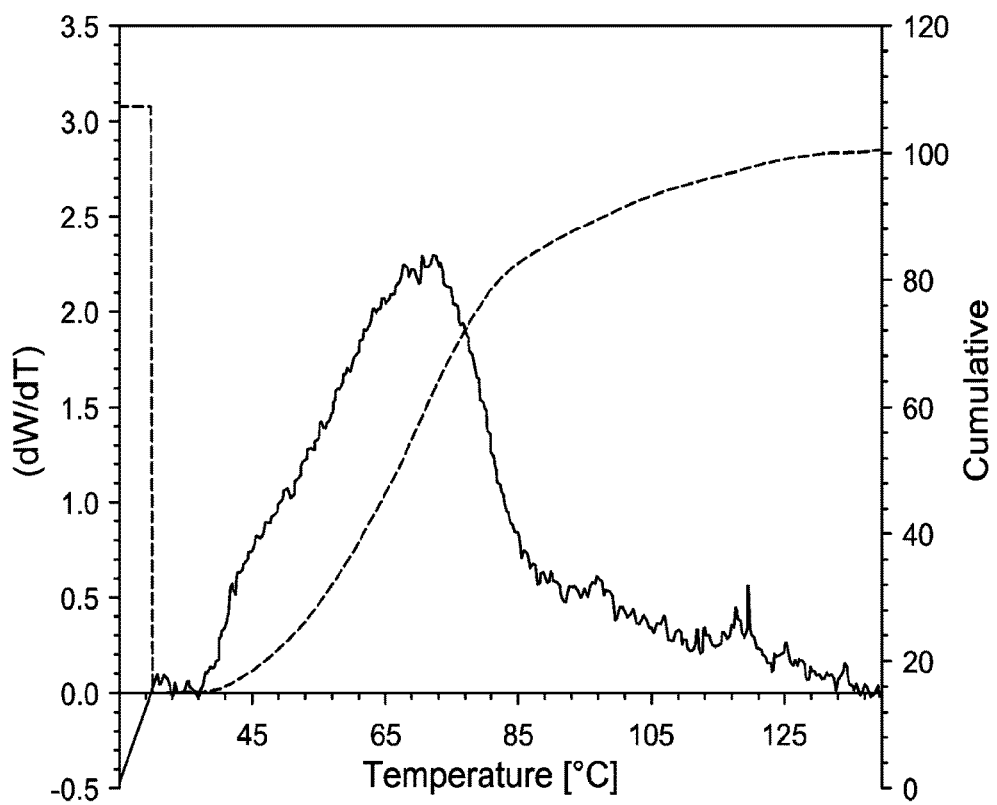
FIG. 3 presents TREF data for a non-limiting example of polyethylene generated in LGPR test.

Gas Phase Polymerization of Ethylene and 1-Hexene, —LGPR Ethylene/1-Hexene Copolymerization Test Polymerization was performed in a gas-phase fluidized bed reactor with a 6" body and a 10" expanded section. Cycle and feed gases were fed into the reactor body through a perforated distributor plate, and the reactor was controlled at 300 psi and 70 mol % ethylene. Reactor temperature was maintained by heating the cycle gas. Supported catalyst I was fed as a 10 wt % slurry in Sono Jell™ from Sonnebom (Parsippany, N.J.). The slurry was thinned and delivered to the reactor by nitrogen and isopentane feeds in the cat probe. Products were collected from the reactor as necessary to maintain the desired bed weight. Average process conditions are listed in Table 3. Characterization data for polymers produced are shown in FIGS. 2a, 2b, and 3.

TABLE 3

Gas Phase Polymerization of Ethylene and 1-Hexene

| Supported Catalyst | Complex A1/$ECl_2$ = 1:1 | Complex A1 |
|---|---|---|
| Temperature (° C.) | 85 | 85 |
| Pressure (psi) | 300 | 300 |
| Ethylene (mol %) | 70 | 70 |
| Hydrogen (ppm) | 1498 | 1260 |
| Hexene (mol %) | 1.76 | 0.42 |
| Bed Weight (g) | 2000 | 2000 |

TABLE 3-continued

Gas Phase Polymerization of Ethylene and 1-Hexene

| Supported Catalyst | Complex A1/ECl$_2$ = 1:1 | Complex A1 |
|---|---|---|
| Residence Time (hr) | 4.2 | 6.8 |
| Cycle Gas Velocity (ft/s) | 1.59 | 1.62 |
| Production Rate (g/hr) | 475 | 292 |
| Activity (gpoly/gsupported cat) | 4198 | 861 |
| Density (g/cm3) | 0.9176 | 0.9179 |
| MI (g/10 min) | 1.22 | — |
| Bulk Density | 0.3389 | 0.4119 |
| Catalyst Slurry Feed (cc/hr) | 1.3 | 3.9 |

As can be seen from Table 3, no measurable MI was observed for the polymer catalyzed by Complex A1 alone up to 1260 ppm hydrogen. This observed negative response to changes of hydrogen concentration makes the first catalyst component Complex A1 useful to produce high molecular weight fractions in the mixed catalyst systems. Particularly, in cases where the second catalyst component would require a high hydrogen environment to produce a desired molecular weight fraction, the first catalyst component would still be capable of producing high molecular weights. In addition, the first catalyst component showed an improved incorporation of hexene, producing a 0.9179 g/cm$^3$ density resin at a gas phase hexene composition of 0.42 mol %.

As can be seen from the GPC graphs in FIGS. 2a and 2b, the polymer exhibited bimodality having a molecular weight distribution greater than 18. In addition, the mixed catalyst systems showed an improved hexene incorporation of greater than 18%.

The polymers produced by the mixed catalyst systems possess an advantageous combination of rheological properties, such as strong shear-thinning (good processability), high melt strength, and strain hardening (good bubble stability) in comparison to polymers produced using the metallocene catalyst alone, and in comparison to conventional polymers.

Figure 4A:
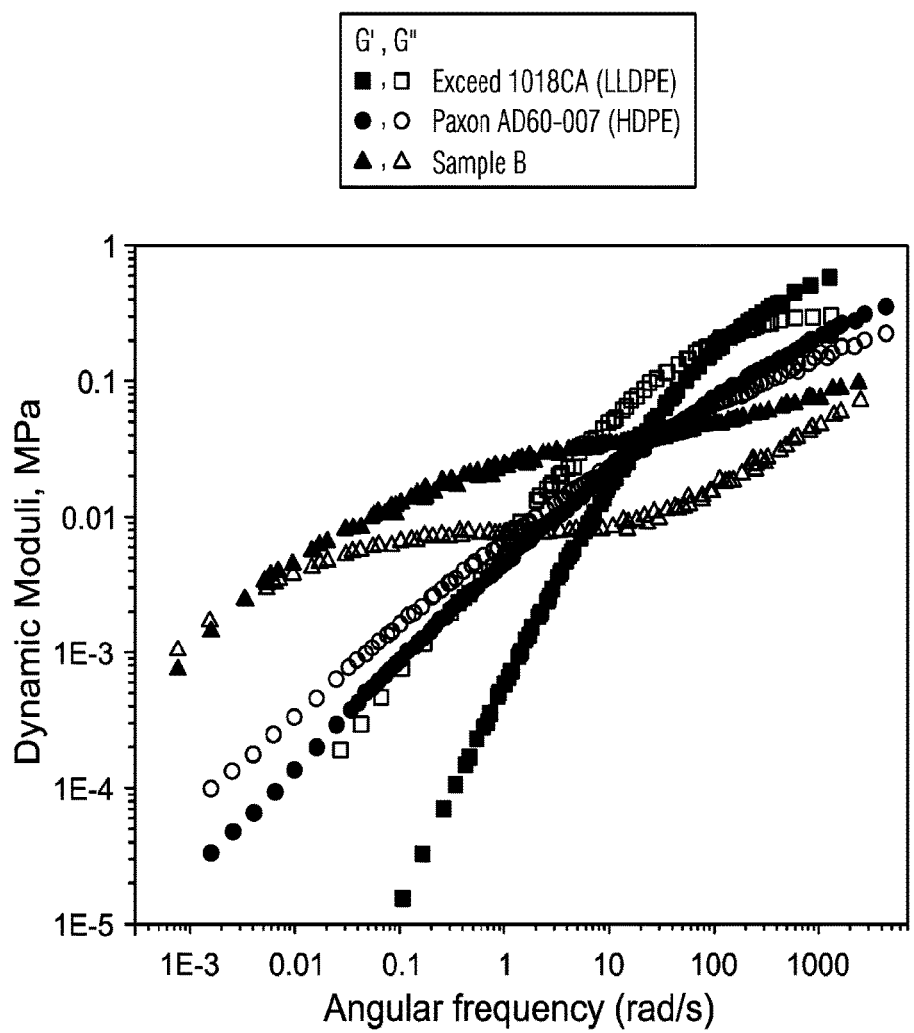
FIG. 4 presents a comparison of linear viscoelastic response of Exceed 1018CA, Paxon AD60-007 and BCT-RESEARCH-132888.
Figure 4B:
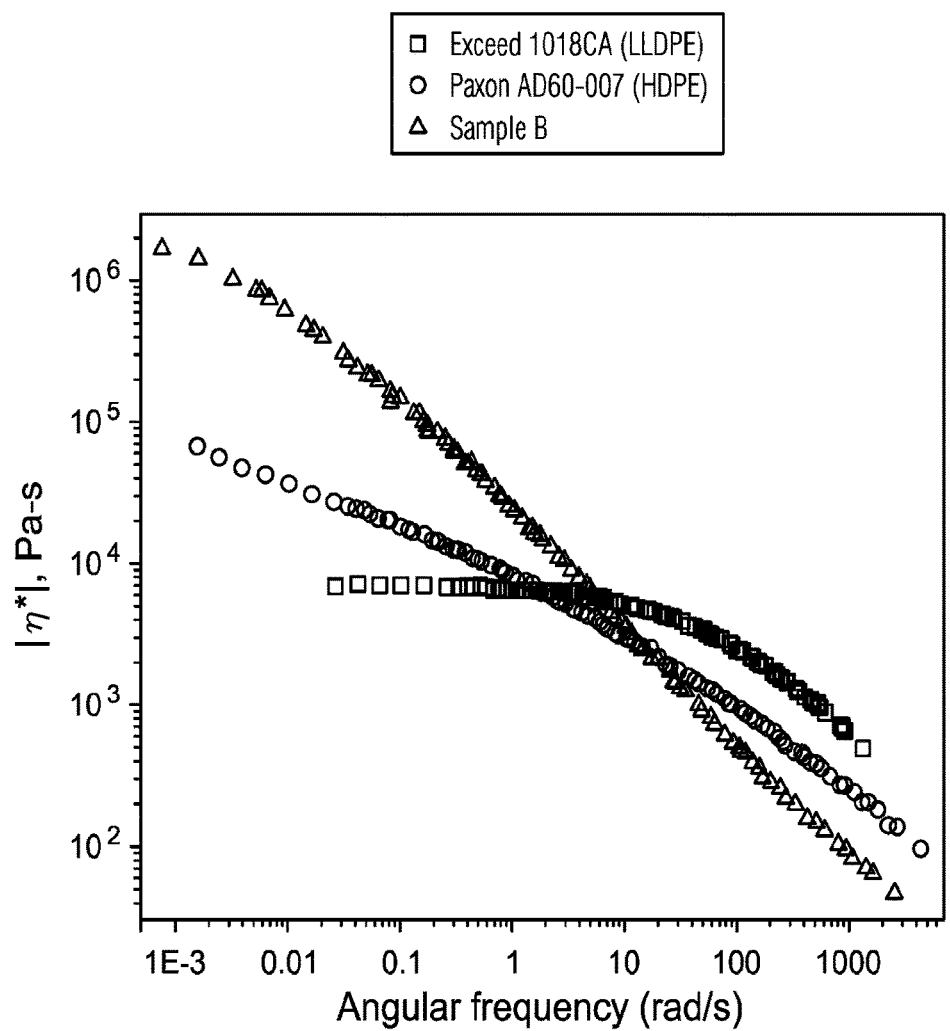
Figure 4C:
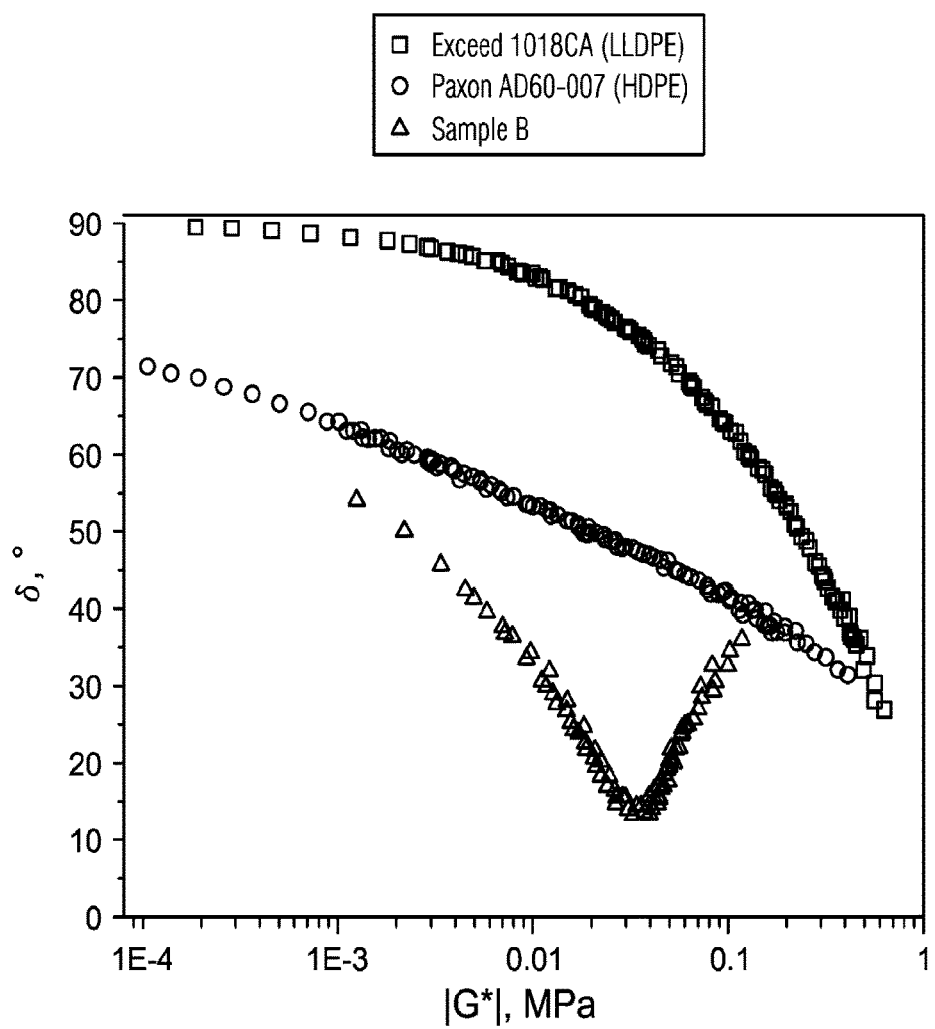

FIG. 4 shows a comparison of the linear viscoelastic response of the inventive sample B with a commercial LLDPE (Exceed 1018CA) and a commercial HDPE (Paxon AD60-007). The data was measured at temperatures ranging from 130° C. to 250° C., and presented as a master curve (with reference temperature of 190° C.) constructed via the time-temperature superposition principle. As can be seen from FIG. 4, the inventive sample shows:

(i) a lower elastic plateau modulus (40 KPa, compared to 1.5 MPa for Exceed 1018CA);
(ii) a zero-shear viscosity more than two orders of magnitude higher than that for Exceed 1018CA, which represents higher melt strength, and superior bubble stability in blown-film process;
(iii) a shear-thinning index comparable to Exceed 1018CA, which is characterized by the slope in the viscosity vs. frequency curve at high frequencies or shear rates, and can be an indication of good processability during shear operation, such as extrusion; and
(iv) a signature of retardation in the relaxation as shown in FIG. 4(c), which is comparable to Exceed 1018CA. Branched polymers show retardation and, as a consequence, strain hardening under elongational flow.

In addition, when a polymer is subjected to uniaxial extension, the transient uniaxial extensional viscosity (referred to herein simply as "extensional viscosity") of the polymer increases with strain rate. It is also known that the extensional viscosity of a linear polymer can be predicted. "Strain hardening" occurs when a polymer is subjected to uniaxial extension and the extensional viscosity increases more than what is predicted from linear viscoelastic theory. As defined herein, the strain hardening index is the ratio of the observed extensional viscosity ($\eta_E^+{}_{observed}$) to the theoretically predicted extensional viscosity ($\eta_E^+{}_{predicted}$). Strain hardening index is expressed herein as the following ratio:

$$\eta_E^+{}_{observed}/\eta_E^+{}_{predicted}$$

For extensional viscosity measurements, the resins were stabilized with 500 ppm of Irganox 1076 and 1500 ppm of Irgafos 168. The extensional viscosity was measured at temperatures of 150° C. and different strain rates, 0.01s$^{-1}$, 0.1s$^{-1}$, 0.3s$^{-1}$, 1s$^{-1}$, 3s$^{-1}$, and 10s$^{-1}$. For example, the extensional viscosity can be measured using a SER-HV-401 Testing Platform, which is commercially available from Xpansion Instruments LLC, Tallmadge, Ohio, USA. The SER Testing Platform was used on a Rheometrics ARES-LS rotational rheometer, which is available from TA Instruments. Inc., Newcastle, Del., USA. The SER Testing Platform is described in U.S. Pat. No. 6,578,413, which is incorporated herein by reference. A general description of extensional viscosity measurements is provided, for example, in, "Strain hardening of various polyolefins in uniaxial elongational flow", The Society of Rheology, Inc. J. Rheol. 47(3), 619-630 (2003); and "Measuring the transient extensional rheology of polyethylene melts using the SER universal testing platform", The Society of Rheology, Inc. J. Rheol. 49(3), 585-606 (2005), incorporated herein by reference.

Figure 5:
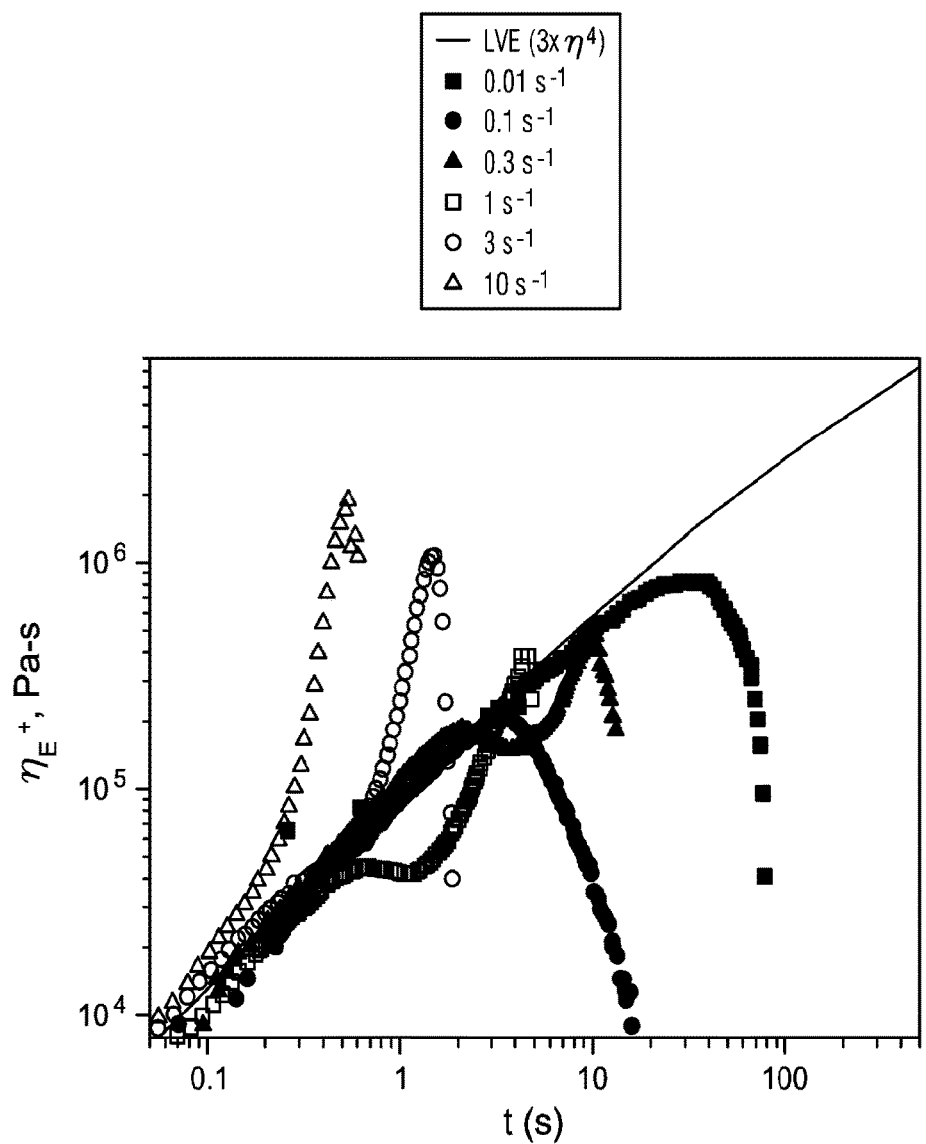
FIG. 5 presents a comparison of extensional viscosity measured at 150° C. of a non-limiting example Bas a function of time.

FIG. 5 provides the extensional viscosity of inventive sample B measured at 150° C. at a function of time. The solid line is the linear viscoelastic envelope defined by the plot of 3 times the shear stress growth curves taken from cone and plate shear measurements.

As can be seen from FIG. 5, at strain rates less than 0.3s$^{-1}$, the sample does not exhibit a sign of strain hardening, whereas at rates above 0.3s$^{-1}$, strain hardening is evident. Strain hardening is normally observed in LDPEs (but not in linear polymers) and it is the result of a high degree of molecular orientation and polymer chain stretch that can be achieved in simple extension. In the inventive sample, strain hardening may be due to the presence of the ultra-high molecular weight fraction, which has a very large relaxation time and therefore can sustain molecular orientation when a high enough "critical" strain rate is applied (in this case 0.3s$^{-1}$ is high enough). This result suggests that by tuning the bimodality (population and molecular weight of both fractions), one could control the critical rate and the strain hardening strength.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. Likewise, the terms "comprising," "consisting essentially of," "consisting of" also include the product of the combinations of elements listed after the term.

The invention claimed is:
1. A supported catalyst system comprising:
(i) at least one first catalyst component comprising a pyridyldiamido transition metal complex;
(ii) at least one second catalyst component comprising a metallocene compound; and
(iii) a fluorided support material,
wherein the pyridyldiamido transition metal complex has the general formula (I):

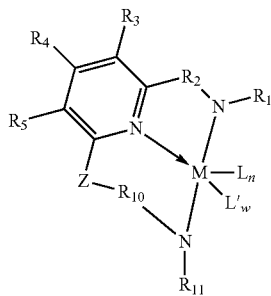

(I)

wherein,
M is Ti, Zr, or Hf;
Z is $-(R_{14})_pC-C(R_{15})_q-$, where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings,
p is 0, 1 or 2, and
q is 0, 1 or 2;
$R_1$ and $R_{11}$ are independently selected from the group consisting of hydrocarbyls, substituted hydrocarbyls, and silyl groups;
$R_2$ and $R_{10}$ are each, independently, $-E(R_{12})(R_{13})-$ with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;
$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;
n is 0, 1, 2, 3, or 4;
L' is neutral Lewis base; and
w is 0, 1, 2, 3, or 4.
2. The supported catalyst system of claim 1, wherein the pyridyldiamido transition metal complex is represented by the formula (II):

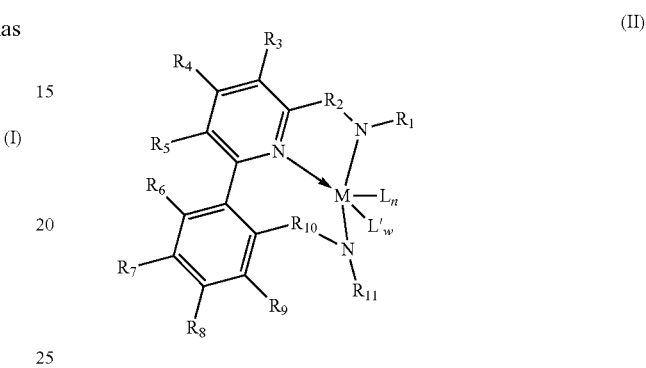

(II)

wherein:
$R_6$, $R_7$, $R_8$, and $R_9$ are independently selected from the group consisting of hydrogen, hydrocarbyls, substituted hydrocarbyls, alkoxy, halogen, amino, and silyl, and the pairs of positions, and wherein adjacent R groups ($R_6$&$R_7$, and/or $R_7$&$R_8$, and/or $R_8$&$R_9$, and/or $R_9$&$R_{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and
M, L, L', w, n, $R_1$, $R_2$, $R_3$, $R_4$, $R_5$, $R_{10}$ and $R_{11}$ are as defined in claim 1.
3. The supported catalyst system of claim 1, wherein the pyridyldiamido transition metal complex is represented by the formula (III):

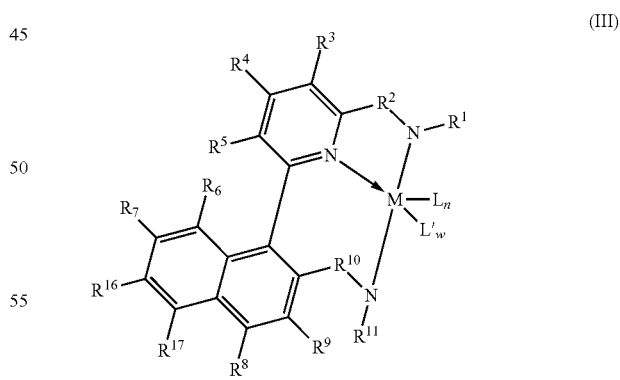

(III)

wherein,
$R^6$, $R^7$, $R^8$, $R^9$, $R^{16}$, and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are as defined in claim 1.

4. The supported catalyst system of claim 1, wherein the metallocene compound is represented by the formula $Cp^A Cp^B M'X'_n$, wherein $Cp^A$ and $Cp^B$ may each be independently selected from the group consisting of cyclopentadienyl ligands and ligands isolobal to cyclopentadienyl, either or both $Cp^A$ and $Cp^B$ may contain heteroatoms, and either or both $Cp^A$ and $Cp^B$ may be substituted; wherein M' is Ti, Zr, or Hf; wherein X' may be any leaving group; wherein n is 0, 1, 2, 3, or 4.

5. The supported catalyst system of claim 1, wherein the metallocene compound is selected from the group consisting of:
   bis(cyclopentadienyl)zirconium dichloride,
   bis(n-butylcyclopentadienyl)zirconium dichloride,
   bis(n-butylcyclopentadienyl)zirconium dimethyl,
   bis(pentamethylcyclopentadienyl)zirconium dichloride,
   bis(pentamethylcyclopentadienyl)zirconium dimethyl,
   bis(pentamethylcyclopentadienyl)hafnium dichloride,
   bis(pentamethylcyclopentadienyl)zirconium dimethyl,
   bis(1-methyl-3-n-butylcyclopentadienyl)zirconium dichloride,
   bis(1-methyl-3-n-butylcyclopentadienyl)zirconium dimethyl,
   bis(1-methyl-3-n-butylcyclopentadienyl)hafnium dichloride,
   bis(1-methyl-3-n-butylcyclopentadienyl)zirconium dimethyl,
   bis(indenyl)zirconium dichloride, bis(indenyl)zirconium dimethyl,
   bis(tetrahydro-1-indenyl)zirconium dichloride,
   bis(tetrahydro-1-indenyl)zirconium dimethyl,
   (n-propyl cyclopentadienyl, pentamethyl cyclopentadienyl)zirconium dichloride, and
   (n-propylcyclopentadienyl, pentamethyl cyclopentadienyl)zirconium dimethyl.

6. The supported catalyst system of claim 1, wherein the fluorided support material has a surface area in the range of from 10 to 700 m²/g and an average particle diameter in the range of from 10 to 500 μm.

7. The supported catalyst system of claim 1, wherein the fluorided support material is selected from the group consisting of silica, alumina, silica-alumina, and combinations thereof.

8. The supported catalyst system of claim 1, wherein the supported catalyst system further comprises an activator.

9. The supported catalyst system of claim 1, wherein the fluorided support material has a fluorine concentration in the range of 0.6 to 3.5 wt %, based upon the weight of the fluorided support material.

10. The supported catalyst system of claim 1, wherein the activator comprises alumoxane.

11. A process for polymerization of olefin monomers comprising contacting one or more monomers with a supported catalyst system, wherein the supported catalyst system comprises:
   (i) at least one first catalyst component comprising a pyridyldiamido transition metal complex;
   (ii) at least one second catalyst component comprising a metallocene compound; and
   (iii) a fluorided support material, wherein the pyridyldiamido transition metal complex has the general formula (I):

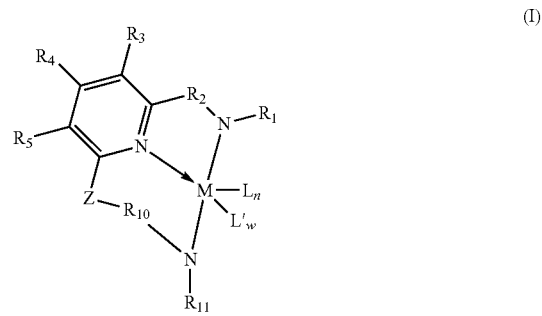

wherein,

M is Ti, Zr, or Hf;

Z is $-(R_{14})_p C-C(R_{15})_q-$, where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1 or 2, and q is 0, 1 or 2;

$R_1$ and $R_{11}$ are independently selected from the group consisting of hydrocarbyls, substituted hydrocarbyls, and silyl groups;

$R_2$ and $R_{10}$ are each, independently, $-E(R_{12})(R_{13})-$ with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;

$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3, or 4.

12. The process of claim 11, wherein the pyridyldiamido transition metal complex is represented by the formula (II):

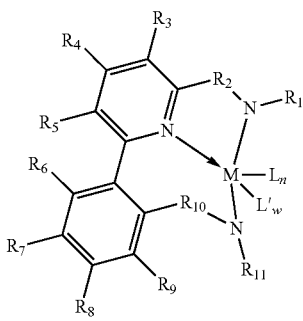

(II)

wherein,
R$_6$, R$_7$, R$_8$, and R$_9$ are independently selected from the group consisting of hydrogen, hydrocarbyls, substituted hydrocarbyls, alkoxy, halogen, amino, and silyl, and the pairs of positions, and wherein adjacent R groups (R$_6$&R$_7$, and/or R$_7$&R$_8$, and/or R$_9$&R$_{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, R$_1$, R$_2$, R$_3$, R$_4$, R$_5$, R$_{10}$ and R$_{11}$ are as defined in claim 11.

13. The process of claim 11, wherein the pyridyldiamido transition metal complex is represented by the formula (III):

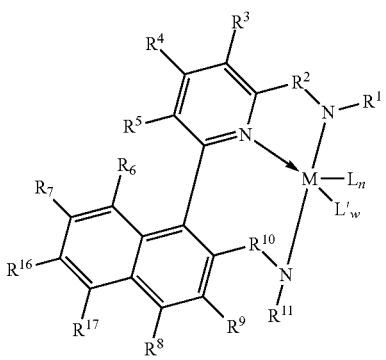

(III)

wherein:
R$^6$, R$^7$, R$^8$, R$^9$, R$^{16}$, and R$^{17}$ are independently selected from the group consisting of hydrogen, hydrocarbyls, substituted hydrocarbyls, alkoxy, halogen, amino, and silyl, and wherein adjacent R groups (R$^6$ & R$^7$, and/or R$^7$ & R$^{16}$, and/or R$^{16}$ & R$^{17}$, and/or R$^8$ & R$^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, R$_1$, R$_2$, R$_3$, R$_4$, R$_5$, R$_{10}$ and R$_{11}$ are as defined in claim 11.

14. The process of claim 11, wherein the metallocene compound is represented by the formula Cp$^A$Cp$^B$M'X'$_n$, wherein Cp$^A$ and Cp$^B$ may each be independently selected from the group consisting of cyclopentadienyl ligands and ligands isolobal to cyclopentadienyl, either or both Cp$^A$ and Cp$^B$ may contain heteroatoms, and either or both Cp$^A$ and Cp$^B$ may be substituted; wherein M' is Ti, Zr, or Hf; wherein X' may be any leaving group; wherein n is 0, 1, 2, 3, or 4.

15. The process of claim 11, wherein the metallocene compound is selected from the group consisting of:
bis(cyclopentadienyl)zirconium dichloride,
bis(n-butylcyclopentadienyl)zirconium dichloride,
bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl)zirconium dichloride, and
(n-propyl cyclopentadienyl, pentamethyl cyclopentadienyl)zirconium dimethyl.

16. The process of claim 11, wherein the fluorided support material has a surface area in the range of from 10 to 700 m$^2$/g and an average particle diameter in the range of from 10 to 500 μm.

17. The process of claim 11, wherein the fluorided support material is selected from the group consisting of silica, alumina, silica-alumina, and combinations thereof.

18. The process of claim 11, wherein the supported catalyst system further comprises an activator.

19. The process of claim 11, wherein the fluorided support material has a fluorine concentration in the range of 0.6 to 3.5 wt %, based upon the weight of the fluorided support material.

20. The process of claim 11, wherein the first catalyst component and the second catalyst component show different hydrogen responses.

21. The process of claim 11, wherein the olefin monomer is selected from the group consisting of ethylene, propylene, 1-hexene, 1-octene and combinations thereof.

22. The process of claim 11, wherein the polymerization is carried out in slurry.

* * * * *